(12) United States Patent
Rai et al.

(10) Patent No.: US 6,337,692 B1
(45) Date of Patent: Jan. 8, 2002

(54) PRIMARY AND SECONDARY COLOR MANIPULATIONS USING HUE, SATURATION, LUMINANCE AND AREA ISOLATION

(75) Inventors: Sanjay Devappa Rai; Nicholas Barton, both of Ft. Lauderdale; Troy Taylor, Boynton Beach; Xueming Henry Gu, Ft. Lauderdale, all of FL (US)

(73) Assignee: Da Vinci Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 09/282,400

(22) Filed: Mar. 31, 1999

Related U.S. Application Data

(60) Provisional application No. 60/080,620, filed on Apr. 3, 1998.

(51) Int. Cl.$^7$ .................................................. G09G 5/02
(52) U.S. Cl. ...................................... 345/594; 345/589
(58) Field of Search ................................ 345/150, 431; 348/153, 649, 650

(56) References Cited

U.S. PATENT DOCUMENTS

| | | | |
|---|---|---|---|
| 4,710,800 A | 12/1987 | Fearing et al. | ................. 358/22 |
| 4,782,384 A | 11/1988 | Tucker et al. | ................. 358/22 |

(List continued on next page.)

FOREIGN PATENT DOCUMENTS

| | | | |
|---|---|---|---|
| EP | 0 488 974 A2 | 6/1992 | ............ H04N/1/00 |
| EP | 0 583 898 A2 | 2/1994 | ........... G06F/15/68 |
| EP | 0 609 567 A2 | 8/1994 | ........... G06F/15/68 |
| WO | WO 87/06419 | 10/1987 | |

OTHER PUBLICATIONS

The Renaissance 8:8:8 User's Guide (Version 1.7, Sep. 1, 1996), Chapter 5.
The DaVinci Renaissance 8:8:8 User's Guide (Version 1.7, Sep. 1, 1996), Chapter 6.
Understanding Color Maps, Picture Publisher 5.0 User's Guide, Web Edition, 1996 by Micrografx, Inc.

(List continued on next page.)

*Primary Examiner*—Matthew Luu
*Assistant Examiner*—Motilewa Good-Johnson
(74) *Attorney, Agent, or Firm*—Morris, Manning & Martin, LLP

(57) ABSTRACT

A color correction system that implements scene-by-scene color manipulation in the primary color domain to color correction regions of a video image isolated in the hue domain using hue, saturation, and luminance qualification. The system may be configured as a number of color correction blocks arranged in series or parallel. Each correction block typically allows a colorist to define up to sixteen non-overlapping hue sectors with associated corrected color values and qualification curves. Each color correction block has two video inputs, a first connected to the output from the previous block, and a second connected to an unprocessed video signal. Each block includes a video multiplexer that operates as a switch allowing the colorist to select either the output of a previous block or the unprocessed video input signal as the input for a given block. Delay buffers are positioned in the unprocessed video signal between each color correction block to synchronize the unprocessed video signal with the output video signal from the preceding color correction block. Thus, the color correction blocks may be applied separately (i.e., in parallel) or in tandem (i.e., in series) for each scene processed. In addition, a particular colorist may select the number of blocks in the system in accordance with that colorist's needs.

59 Claims, 15 Drawing Sheets

U.S. PATENT DOCUMENTS

| | | | |
|---|---|---|---|
| 4,908,874 A | 3/1990 | Gabriel | 382/41 |
| 4,952,051 A | 8/1990 | Lovell et al. | 352/87 |
| 4,954,881 A | 9/1990 | Kaye | 358/22 |
| 5,050,984 A | 9/1991 | Geshwind | 352/38 |
| 5,051,928 A | 9/1991 | Gruters | 364/521 |
| 5,252,953 A | 10/1993 | Sandrew et al. | 345/122 |
| 5,327,501 A | 7/1994 | Kato et al. | 382/44 |
| 5,450,500 A | 9/1995 | Brett | 382/162 |
| 5,495,540 A | 2/1996 | Frankot et al. | 382/294 |
| 5,506,946 A | 4/1996 | Bar et al. | 395/131 |
| 5,506,949 A | 4/1996 | Perrin | 395/152 |
| 5,530,774 A | 6/1996 | Fogel | 382/154 |
| 5,850,471 A | 12/1998 | Brett | 382/162 |
| 5,874,988 A | 2/1999 | Gu | 348/97 |
| 6,031,543 A * | 2/2000 | Miyashita et al. | 345/431 |

OTHER PUBLICATIONS

Adobe Photoshop User Guide (Version 4.0 pp. 146–151).

Matsuyama et al., Multiply Descent Cost Competitive Learning as an Aid for Multimedia Image Processing, Proceedings of 1993 International Joint Conference on Neural Networks, Oct. 28, 1993.

* cited by examiner

PRIMARY AND SECONDARY COLOR MANIPULATIONS USING HUE, SATURATION, LUMINANCE AND AREA ISOLATION

This application claims benefit of Provisional No. 60/080,620 filed Apr. 3, 1998.

TECHNICAL FIELD

The present invention relates generally to image processing, and more particularly relates to a system and methods that allow the user of an image processing system to implement scene-by-scene color manipulation in the primary color domain to color correction regions of a video image isolated in the hue domain using hue, saturation, and luminance qualification.

BACKGROUND OF THE INVENTION

In a video signal color correction system, various types of image processing are often employed to create, enhance, compress, filter, or otherwise modify characteristics of the video image. In certain types of video image processing systems, especially post-production color correction systems for motion picture film and/or video tape, color corrections are typically made on a scene-by-scene basis. A "scene" is a sequential collection of images, often shot from the same camera, having the same viewpoint, composed in a certain way, etc. An operator using a typical post-production color correction system observes a target frame of the scene on a video monitor, adjusts the color and other parameters of the frame until it is aesthetically satisfactory, and stores the color correction parameters in system memory. The color correction system preferably automates the application of the stored color correction parameters to the other frames of the scene.

For example, the system operator or "colorist" typically selects a scene to manipulate, and then selects a particular frame from the scene for manual manipulation. The colorist views the target frame as a still image on the system monitor and applies color corrections via a control panel to adjust the color parameters for a particular region of the target frame. The color correction system typically allows the colorist to isolate a particular region of the frame and to alter the intensity of the primary color components, red, green and blue, which in various combinations produce all of the colors that the system can produce. The colorist may than apply color corrections to another region of the frame, and so forth, until all of the desired regions have been color corrected. The correction settings are then stored in system memory.

After the colorist is satisfied with the adjustments made to the target frame, the color correction system, which is typically computer-controlled, automatically applies the stored color corrections to each frame in the scene on a frame-by-frame basis. The color corrected frames of the scene are then recorded on film or videotape. The steps are repeated for other scenes in the film or video tape, often with different correction settings stored for different scenes. This process may be repeated as needed to create a color corrected master film or video tape that reflects multiple color adjustments to multiple frames in multiple scenes. In the general case, multiple color adjustments may be applied to all of the frames of a motion picture or other video program.

Devices are known in the art for isolating a region of a still image for applying one set of color corrections, with other regions of the image receiving a different set of color corrections. These devices allow a color correction system to isolate a particular region of a frame to receive special image processing. For example, when color correcting a soft drink commercial it may be desirable to isolate the beverage container from the remainder of the image. The color of the beverage container may then be enhanced to make the can stand out from the rest of the image. But applying color correction to each frame of a film or video tape individually is extremely tedious and time consuming. Automating the process of applying the color correction parameters defined for one frame of a scene to the other frames is, therefore, highly desirable.

Automatically isolating a color correction region presents a difficult technical problem because the region of interest may change in size, shape, location, and/or geometry over the frames in a scene. That is, an object in a video scene typically moves over the frames of the scene. For example, consider a scene in which a bottle is lifted, tilted, moved toward a glass, turned toward the viewer, and then further tilted to pour the contents of the bottle into a glass. In this scene, the geometry of the bottle changes from a side view of the bottle (an irregular shape) to a top view of the bottle (an essentially round shape). The bottle also changes in location and size over the several frames of the scene.

The state of the art in automated color correction technology is somewhat lacking for a number of reasons. Video images are typically defined on a pixel-by-pixel basis by intensity levels of the primary colors, red, green and blue (R,G,B). In a typical color correction system, the primary colors are mixed in varying intensities to produce all of the colors that the system can produce. Color data in the R,G,B format, often referred to as the "primary color domain," may be linearly transformed into secondary color components, hue, saturation and luminance, which is sometimes referred to as the "hue domain." Certain prior art color correction systems apply color corrections in the primary color domain, whereas others apply color corrections in hue domain.

Operating in the primary color domain has certain drawbacks associated with isolating color correction regions. In a color video image, the intensity of the red, green, and blue components for a particular object depicted in a scene can vary from frame to frame in response to the brightness, or shadowing, of the item. In addition, many different colors may have the same intensity of one of the particular color components. For this reason, it is difficult to isolate a particular object in a scene by focusing on the intensity of the red, green, and blue constituents of the pixels of the object. In other words, isolating a particular object, as that object moves from frame to frame within a scene, is difficult when analyzing the video data in the primary color domain.

Color correction systems that operate in the hue domain have been developed to overcome the region isolation drawbacks associated with color correction systems that operate in the primary color domain. For example, color correction systems have been developed that allow an operator to select and manipulate a color correction region in the hue domain. These systems typically include equipment for generating and positioning a cursor on a video monitor to allow selection of a color correction region defined by the hue at the selected position. Circuitry responsive to the cursor location selects one of a plurality of color correction circuits to become operative for directing secondary color correction parameters (i.e., adjustments to the hue, saturation, and luminance) only to regions in the video image corresponding to the hue selected by the cursor. This type of system therefore allows application of secondary color correction parameters to all regions of the image bearing the hue that was selected with the cursor.

Color correction systems that operate in the hue domain, however, also exhibit certain drawbacks. First, they incur a relatively high processing overhead because the entire video image is typically transformed from the primary color domain to the hue domain. Color corrections are then applied in the hue domain, and the image is then transformed back from the hue domain to the primary color domain. Thus, the system performs two linear transformations on the entire video image even though no color corrections may be applied to large portions of the image. As a result, even those portions of the video image that are not color corrected must be transformed from the primary color domain to the hue domain, and then back to the primary color domain.

Second, transforming color data from the primary color domain to the hue domain, and then back to the primary color domain, can impart "color artifacts" into the video image. That is, applying a linear mathematical operation to digital data, followed by the inverse mathematical operation, can alter the data for a small percentage of pixels. This phenomenon occurs due to the truncation of irrational numbers in floating-point arithmetic. Stated differently, due to the limited precision of linear mathematical operations applied to digital data, applying an arithmetic operation to digital data, followed by the inverse arithmetic operation, can alter the values for some of the data points. Although the vast majority of data points are not altered by the arithmetic operations, a small percentage of data points are typically altered. These altered data points are known as "color artifacts."

To avoid the combined drawbacks associated with region isolation in the primary color domain and color artifacts created through operation in the hue domain, color correction systems have been developed that apply color corrections in the primary color domain using geometric constraints to isolate color correction regions. For example, certain color correction systems include a video parameter control system operative for selecting a spatial region or window in a video image for color correction. A track ball allows selection of a spatial region by dragging a cursor to draw a window around an object of interest in the picture. The operator then adjusts controls that affect only the selected window or region. A first set of correction signals may be stored for the selected region, and a separate second set of correction signals may be stored for areas of the picture outside the selected region, thereby allowing multiple sets of corrections for a given frame. Although these systems provide some control over the movement of the window over a plurality of frames in a scene, the region is essentially static and the geometry is invariably that of a box.

Other prior art image processing computer software known as the "Simple Windows" and "Power Windows" features are extensions of the windows features of previous system. These features are provided in the RENAISSANCE 8:8:8™ digital color enhancement system, manufactured by the assignee of the present invention. In the Simple Windows feature, a window is a predetermined regularly shaped area or region of the video image that can be varied in size. The colors within the window are independently adjustable from the colors of the rest of the image. Primary or secondary color enhancements can occur both inside and outside a window, and each adjustment is independent of the other. The Simple Windows feature entails use of a simple geometric form—a square or rectangle—for a window shape. A Simple window is always rectangular and is defined by four points. Lines defining the window are always straight vertical or horizontal. Furthermore, there are no soft edges, that is, there is a sharp delineation between the inside and outside of the window, which sometimes produces undesirable image effects at the boundaries.

The more recent "Power Windows" feature provides more choices of the shape for the window, for example, circular, rectangular, half screen, split in the middle, etc. Using this system, the operator can select windows including multiple squares, multiple diamonds (essentially rotated squares), horizontal and vertical bars, circles, ellipses (a warped circle), and so forth. The sizes of these windows can be varied so long as the shape remains regular. Furthermore, a "soft edges" feature is available to provide a gradual transition in color correction from the inside to the outside of a selected window. Power Windows, however, are still confined to regular shapes, with predefined geometry.

The commonly owned patent application Ser. No. 08/912,662, entitled "User Defined Windows For Selecting Image Processing Regions," filed Aug. 18, 1997 by Xueming Henry Gu, et al., describes further improvements in the RENAISSANCE 8:8:8™ digital color enhancement system. This system allows the user to select color correction regions corresponding to objects in a target frame using a geometric masking technique. For example, the user may mask the same object in the first and last frames of a scene. The system then automatically "morphs" or changes the shape of a selected object over the intervening frames of a scene. Although the system can automatically morph an object over a number of frames, the edges of the automatically-morphed object can diverge from the edges of the actual object in the scene. The system therefore includes a utility that allows the user to manually correct automatically-morphed objects on a frame-by-frame basis. While this utility is quite effective for correcting unacceptable divergence, manually imparting the required adjustments on a frame-by-frame basis can be tedious and time consuming.

In sum, there is a continuing need for a color correction system that allows the isolation of color correction regions that move and change size and geometry over several frames in a scene. There is a further need for a color correction system that isolates regions and implements color corrections without imparting color artifacts into the video image. And there is a need for further for automating the process of color correction region isolation to minimize or obviate the need for manual frame-by-frame adjustment of the processed video image.

SUMMARY OF THE INVENTION

The present invention overcomes the disadvantages described above in a color correction system that implements primary color manipulation using secondary color correction region isolation. As such, the system performs color correction in the primary color domain, which means that color data that is not manipulated passes through the system unaltered. This aspect of the invention prevents color artifacts from appearing in the processed video image and lowers the data processing overhead because no operations, other than timed buffering to maintain synchronism, are performed for unprocessed or pass-through pixels.

Although color correction is performed in the primary color domain, the system isolates color correction regions through operations performed in the hue domain. Specifically, hue qualification, saturation qualification, luminance qualification, and an optional alpha filter are combined to define an alpha qualification function that isolates a region or "hue sector" for color correction. The alpha qualification function may have a shape in the hue domain that tapers or softens the applied color correction towards the edges of the corrected hue sector. The system includes a user interface that allows the colorist to select the shape of the hue, saturation, and luminance alpha qualification functions, as well as the shape of the optional alpha filter, in the hue domain. This aspect of the invention gives the colorist fine control over the color isolation and correction process, including fine control over the sharpness of the color correction at the edges of color corrected hue sectors.

Color correction region isolation in the hue domain may be combined with geometric constrains. Geometric constraints allow the colorist to limit the automatic application of color correction to a defined portion of the frame area, over the several frames of a scene. As a mechanism for selectively applying color correction to the frames of a scene, geometric constraints may be used to increase the system's ability to isolate discrete objects for color correction. For example, a colorist may use a geometric constraint to exclude from color correction discrete objects that have a similar color to a target object.

Generally described, the invention is a computer-implemented process for selectively applying image processing to an image. Color correction equipment receives an input signal from an image source in a primary color domain. The color correction equipment also receives a command selecting a sample of the input signal, and a command identifying a color correction parameter in the primary color domain associated with the sample. The color correction equipment determines a hue-domain parameter associated with the sample and a sector in the hue-domain about the hue-domain parameter associated with the sample. The color correction equipment then defines a qualification curve corresponding to the sector and mixes the input signal and the color correction parameter within the sector in accordance with the qualification curve. The hue-domain parameter may be selected from the group including hue, saturation, and luminance.

The color correction equipment may also determine a second hue-domain parameter associated with the sample and define a second qualification curve about the second hue-domain parameter and corresponding to the sector. The first and second qualification curves are then combined to obtain a combined qualification curve. In this case, the color correction mixes the input signal and the color correction parameter within the sector in accordance with the combined qualification curve. The first and second hue-domain parameters may be selected from the group including hue, saturation, and luminance.

In addition, the color correction equipment may determine a third hue-domain parameter associated with the sample and define a third qualification curve about the third hue-domain parameter and corresponding to the sector. The first, second, and third qualification curves are then combined to obtain a total qualification curve. In this case, the color correction equipment mixes the input signal and the color correction parameter within the sector in accordance with the total qualification curve. The first, second, and third hue-domain parameters may include the hue, saturation, and luminance.

The color correction equipment may also apply a filter to the total qualification curve to obtain an alpha qualification curve. If this case, the color correction equipment mixes the input signal and the color correction parameter within the sector in accordance with the alpha qualification curve. Moreover, the color correction equipment may receive a command defining a geometric constraint corresponding to the input signal. In this case, the color correction equipment limits the mixing the input signal and the color correction parameter in accordance with the geometric constraints.

The invention also provides a computer-implemented process for selectively applying image processing to a plurality of frames defining a scene. Color correction equipment receives an input signal defining the scene from the image source in a primary color domain. The color correction equipment also receives a command selecting a target frame of the scene and another command selecting a sample of the target frame. The color correction equipment also receives a command identifying a color correction parameter in the primary color domain associated with the sample. The color correction equipment then determines a hue-domain parameter associated with the sample and defines a sector in the hue-domain about the hue-domain parameter associated with the sample. The color correction equipment also defines a qualification curve corresponding to the sector. Then, for each frame of the scene, the color correction equipment mixes the input signal and the color correction parameter within the sector in accordance with the qualification curve.

These and other features and advantages of the invention may be more clearly understood and appreciated from a review of the following detailed description of the disclosed embodiment, and by reference to the appended drawings and claims.

DETAILED DESCRIPTION OF THE DISCLOSED EMBODIMENT

Figure 1:
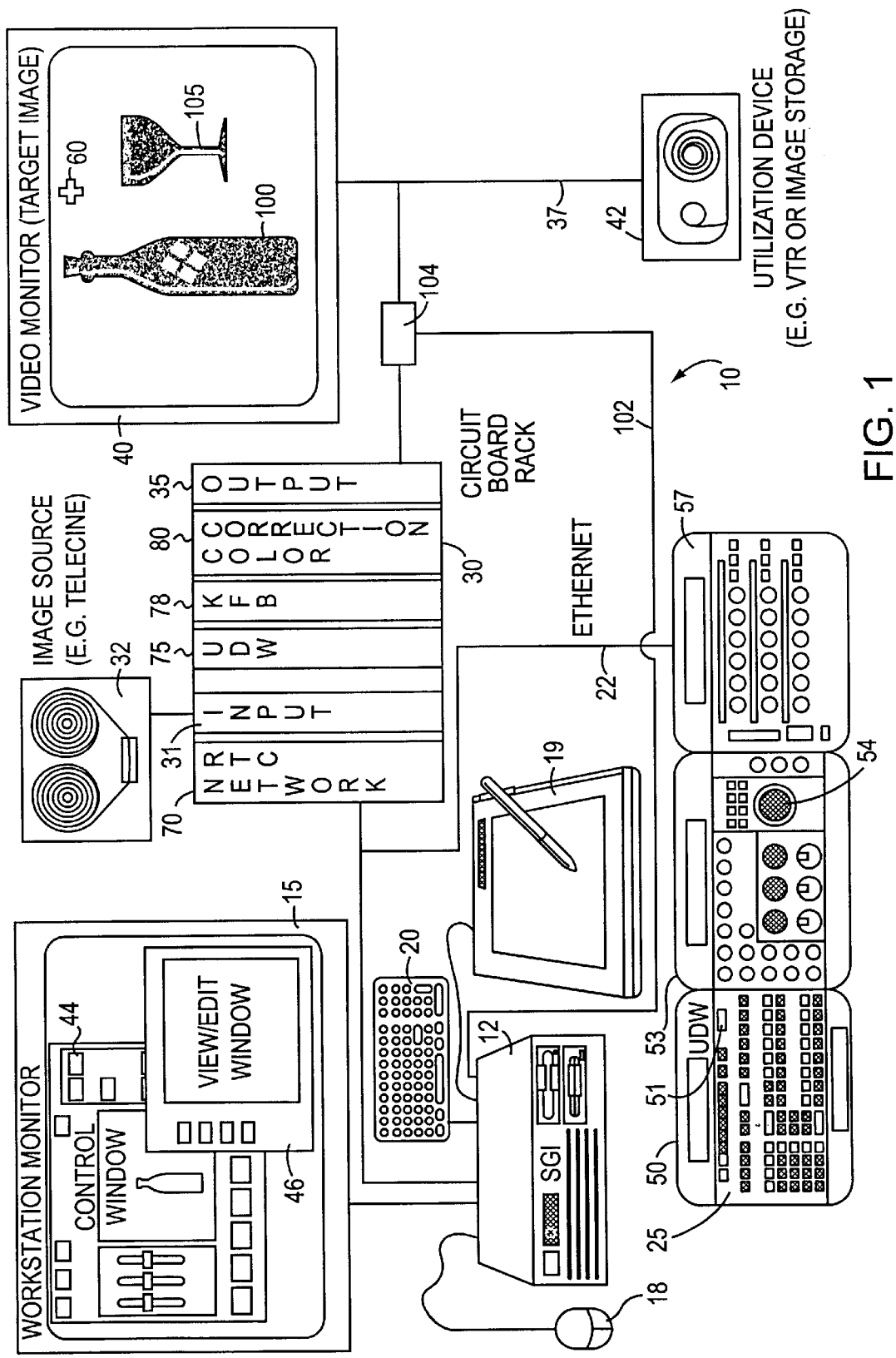
FIG. 1 is a schematic block diagram of a color correction system constructed in accordance with an illustrative embodiment of the present invention.

The invention may be embodied a color correction system that implements scene-by-scene color manipulation in the primary color domain to color correction regions of a video image isolated in the hue domain using hue, saturation, and luminance qualification. The invention may be implemented using programmable logic units (PLUs), field-programmable gate arrays (FPGAs), or other types of reprogrammable parallel-processing hardware. The system may be configured as a number of color correction blocks arranged in series or parallel. Each correction block typically allows a colorist to define up to sixteen non-overlapping hue sectors with associated corrected color values and qualification curves.

The color correction equipment processes a real-time video signal propagating at 74 mHz even though the color processing circuitry operates at 66 mHz. This is possible because only a subset of the video signal needs to be passed through the color processing circuitry. In particular, each frame of video data includes a visible raster defining the image shown on a display device, and a non-visible portion including horizontal and vertical overscan areas, retrace intervals, and so forth. Only the visible raster portion of the video signal needs to be passed through the color processing circuitry. The color correction equipment therefore strips the visible raster out of each frame and passes only the pixels of the visible raster through the 66 mHz color processing circuitry.

The non-visible portion of each frame bypasses the color processing circuitry in an unprocessed input video data signal propagating at 74 mHz. After the color corrected visible raster exits the color processing circuitry, the non-visible portion of each frame is recombined with the color corrected visible raster to construct a complete output frame of video data. Of course, the timing must be controlled so that the color-corrected visible raster reaches the combining circuitry at the same time as the unprocessed input video signal. Because the ratio of the data in the visible raster to the data in a complete frame is equal to or less than the ratio of the data propagation rates (i.e. 66 mHz:74 mHz—about 89%), the color correction equipment can perform the required timing operation, which allows the equipment to process an input video signal propagating at 74 mHz in real time.

Each color correction block has two video inputs, a first input connected to the output from the previous block, and a second input connected to an unprocessed video signal. Each block includes a video multiplexer that operates as a switch allowing the colorist to select either the output of a previous block or the unprocessed video input signal as the input for a given block. Delay buffers are positioned in the unprocessed video signal between each color correction block to synchronize the unprocessed video signal with the output video signal from the preceding color correction block. Thus, the color correction blocks may be applied separately (i.e., in parallel) or in tandem (i.e., in series) for each scene processed. In addition, a particular colorist may select the number of blocks in the system in accordance with that colorist's needs.

To define color correction for a scene of a video image, a colorist first defines a scene and selects one of the frames of the scene as a target frame for manual manipulation. The image processing system includes a user interface that allows the colorist to select hue sectors for isolation by placing a cursor on a desired location of the target frame. The user interface displays the hue, saturation, and luminance of the sample of pixels under the cursor. The user interface also displays qualification curves about these hue, saturation, and luminance values. The colorist may then adjust the qualification curves to define the shape and size of the hue sector that defines the color correction region. The qualification curves defined about the hue, saturation, and luminance values displayed on the user interface determine both a hue sector to receive color correction and a qualification curve establishing the percent of color correction to be applied over the hue sector.

The user interface also allows the colorist to select corrected color values for each hue sector. Each color correction block blends the input color values with the corrected color values on a pixel-by-pixel basis through application of an alpha qualifier in an alpha mixer. The alpha qualifier reflects the product of the hue, saturation, and luminance qualifiers for a particular pixel's color value, where each qualifier is a point on a corresponding qualification curve. The final alpha qualifier may also reflect an additional alpha filter qualifier that further modifies the product of the hue, saturation, and luminance qualifiers. The final alpha qualification curve typically includes a full color correction zone around the hue, saturation, and luminance values of the sample of pixels under the cursor. In this full color correction zone, the color value of the output signal is equal to the corrected color value. That is, the input color value is completely replaced by the corrected color value for input color values that fall within the full color correction zone.

The final alpha qualification curve also includes transition zones within the hue sector but outside of the full color correction zone. In the transition zones, the alpha mixer uses the alpha qualification curve to blend the input color values with the corrected color values set by the colorist. For a given pixel, the output color value is computed as a weighted sum of the input color value and the corrected color value, where the alpha qualifier defines the weighting coefficients. The alpha mixer thus permits smoothing of the color correction, or a gradual reduction in the amount of color correction applied at the edges of the hue sector. As a result, the output color values typically include increasing amounts of the input color values as the hue-domain color parameters (hue, saturation, and luminance) diverge from the hue-domain values of the sample of pixels under the cursor. Because the colorist may define the hue, saturation, and luminance qualifiers independently, the blend at the edges of the hue sector may be based on hue, saturation or luminance, or a combination of these parameters. As noted previously, an additional alpha filter may further shape the final alpha qualifier applied by the alpha mixer.

Each color correction block allows the colorist to define qualifiers and color correction values for up to sixteen non-overlapping hue sectors, which are also referred to as color correction channels. As an additional option, the user interface allows the colorist to define one or more geometric constraints for each color correction channel. For example, a geometric constraint may be a window that restricts the application of color correction for the corresponding hue sector to the portion of the frame inside, or alternatively outside, the window. Geometric constraints allow the colorist to limit the automatic application of color correction to a defined portion of the frame area, over the several frames of a scene. Geometric constraints therefore increase the system's ability to isolate discrete objects in a video scene for color correction.

Once the colorist is satisfied with the color correction defined for the target frame, the color correction system automatically applies the color correction parameters defined for the target frame to the other frames of the scene. That is, the color correction system isolates color correction regions in each frame of the scene using the qualification curves defined for the target frame. The system also mixes the corrected color values defined for the target frame with the input color values of each frame of the scene using the qualification curves defined for the target frame. Specifically, the color correction system applies the corrected color values to the isolated regions by mixing the input color values with the corrected color values on a pixel-by-pixel basis through application of an alpha qualifier in the alpha mixer. The steps are repeated for other scenes in the film or video tape, often with different correction settings stored for different scenes. This process may be repeated as needed to create a color corrected master film or video tape that reflects multiple color adjustments to multiple frames in multiple scenes.

Although the disclosed embodiment of the invention is described in the context of a scene-by-scene digital color correction system, those skilled in the art will understand that the invention is not limited to video color correction, but may be equally useful in other types of color image processing in which there is a need for region isolation, such as image compression, image filtering, noise suppression, animation, and many other image processing techniques.

The invention is particularly useful in an image processing application in which there is a need to define a first region of an image for receiving one type of data processing, and another region for receiving a different type of data processing. The disclosed embodiment, however, is specifically tailored to operate as a scene-by-scene color correction system in which several frames defining a scene of a video program may receive automatic color corrections defined for a selected target frame of the scene. Thus, the disclosed embodiment is particularly useful as a color correction or color enhancement system for video programs, including motion pictures, television programs, video-taped recordings, and the like.

Certain methods associated with the disclosed embodiment are presented in terms of exemplary display images, algorithms, and symbolic representations of operations of data within the computer's memory. As known to those skilled in the programming arts, these are typical techniques used by those skilled in the art of computer programming and computer construction to convey teachings and discoveries to others skilled in the art. The description of the methods involved in the present invention include numerous details, such as computer display system elements, aspects of computer program user interfaces, display screens and formats, sample data, and so forth, in order to provide an understanding of the invention. Nevertheless, those skilled in the art will understand that the invention may be practiced without these specific details. In addition, well-known circuits, programming methodologies, and structures utilized in the present invention may not be described in detail to avoid obscuring the inventive aspects of the disclosed embodiments.

For purposes of this discussion, an "algorithm" is generally a sequence of computer-executed steps leading to a desired result. These steps require physical manipulations of physical quantities. Usually, though not necessarily, these quantities take the form of electrical, magnetic, or optical signals that may be stored, transferred, combined, compared, or otherwise manipulated. Those skilled in the art typically refer to these signals as bits, values, elements, symbols, characters, images, terms, numbers, or the like. It must be understood that no involvement of a human operator is necessary or even desirable in many aspects of the present invention, since the operations described (except those specifically identified as originating with the operator, user, or colorist) are machine operations performed in conjunction with a human operator that interacts with the computer.

Furthermore, it should be kept in mind that there is a distinction between the methods, steps, or operations carried out by a computer, and the method of computation itself. The present invention does not involve methods of computation. The invention rather relates to methods, steps, or operations for a computer processing electrical or other physical signals, generating desired physical signals, and displaying results and user interfaces. As shown in FIG. 1, the present invention relates to a system 10 for performing these operations.

It should be further understood that the operations described in this specification are not related or limited to any particular computer or apparatus. Rather, various types of general purpose or specialized machines may be used with programs constructed in accordance with invention. These machines may be general purpose digital computers, application-specific integrated circuits, parallel-processing hardware, neural networks, or other types computing devices. Nevertheless, it is considered advantageous to construct a specialized apparatus to perform the operations associated with the invention using parallel-processing circuitry, such as programmable logic units (PLUs), field-programmable gate arrays (FPGAs), or other types of reprogrammable parallel-processing hardware.

Image Processing System

Referring now to the drawings, in which numerals indicate like elements or steps throughout the several figures, FIG. 1 illustrates an image processing system 10 constructed in accordance with an illustrative embodiment of the present invention. The image processing system 10 is suitable for processing video data by carrying out primary color manipulation using secondary color correction region isolation. The image processing system 10 includes several basic components: a computer-based workstation 12 including monitor 15 and keyboard 20, a colorist's control panel 25, a digital color correction system 30, a source of video images 32, a video display 40, and a computer storage medium for processed images 42. The workstation 12 preferably includes pointing devices, such as a mouse 18 and/or graphics tablet 19. The workstation 12 is coupled for data communications via a network connection 22, preferably a high speed network such as an Ethernet, to the color correction system control panel 25 and the color correction system 30.

The source of images 32 may be an analog source, such as a telecine or video tape player, or the source may be a digital video storage medium. The source is connected to an input circuit board 31 in the color correction system 30, which converts analog input signals to digital signals if necessary. The image signals internal to the color correction system 30 are digital, and are stored and manipulated in a digital video format, such as the International Radio Consultant Committee (CCIR) promulgated Recommendation No. 601-1 (1986), which is incorporated into this specification by reference. The standard signals defined in Recommendation 601-1 essentially consist of a luminance signal Y and two color difference signals (R-Y) and (B-Y). It is well known that, since the luminance signal contains information on levels of red, green, and blue (R,G,B), the three standard 601-1 signals can be used to reproduce the R,G,B levels for any given set of samples.

The color correction system 30 converts the 601-1 signals to corresponding signals in the primary color domain (i.e., digital R,G,B signals). The color correction system 30 then manipulates the resultant signals in the primary color domain. The corrected or modified signal can then be passed through a signal matrix to convert the modified digital signal to an analog format suitable for storage on a medium, such as video tape, that may, in turn, be used to drive an analog display device, such as a television or other video display. The color correction system 30 also includes an output circuit board 35 that typically converts the digital signals within the color correction system into analog form for immediate display to the operator of the system. Thus, the output circuit 35 is coupled via a video signal cable 37 to a video monitor 40 and to a utilization device 42, such as a video tape recorder or other image storage device. Alternatively, the corrected digital signals can be stored in digital form in a digital data storage device coupled to the system.

Because the image source 32 is located downstream from the SGI workstation 12, and the workstation uses color data to isolate color correction regions, the image processing system 10 includes mechanism to provide an input color video signal to the workstation. This mechanism is a splitter 104 that divides the signal of the output video cable 37 to provide the input color video signal for the workstation 12. One output of the splitter 104 is connected via an input video signal cable 102 to the SGI workstation 12. The other output of the splitter 104 is connected via the output video cable 37 to the video monitor 40 and utilization device 42. The preferred graphics tablet 19, which is particularly useful for certain manipulations of geometric constraints, is a Wacom ArtPad™ or ArtZ™ graphics tablet manufactured by Wacom Technology Corporation, Vancouver, Wash. 98661.

The preferred workstation 12 is an INDY™ model workstation manufactured by Silicon Graphics, Inc. (SGI). The preferred workstation includes an R4600 RISC processor operating at least at 133 MHz, internal 24-bit XL color graphics (with R,G,B single- or double-buffer color indices), a digital video input port capable of storing 640×480×30 fps to memory, 2 serial and 1 parallel data port, an Ethernet network port, a fast SCSI-2 data port, at least 32 megabytes of RAM, and a 1.0 or larger Gb hard disk. The workstation 12 also includes an on-board display driver circuit, namely, the 24-bit XL color graphics circuitry with R,G,B double-buffer color indices, which provides video signals to at least one workstation monitor 15. A separate, second video monitor displays a target image, typically a full-screen representation of the video image being processed by the system. Optionally, a different SGI model workstation may be employed, for example one including a video adapter card that drives multiple monitors. If a workstation model is employed that supports multiple monitors, the second monitor may also be connected to the workstation. Further details of the preferred workstation are available in the literature supplied by the manufacturer.

The preferred color correction system 30 is a Da Vinci RENAISSANCE 8:8:8™ digital color corrector manufactured by Da Vinci Systems, Inc., Ft. Lauderdale, Fla. (assignee of the present application). This color correction system 30, which is coupled to the control panel 25, includes various circuit board components that carry out digital video signal processing. The preferred RENAISSANCE 8:8:8™ control panel 25 includes three separate panels, each having a combination of dedicated keys, soft keys, and soft knobs that provide many simultaneous functions utilized in the color correction process. A dedicated keyboard 50 contains both dedicated and soft keys for system feature control, display/list management, source and destination motion control, editing, special effects features, and the like. This keyboard also contains a slide-out alphanumeric keyboard (not shown) to enter names, comments, and other important session information. Included on this control panel is a "User Definable Windows" (UDW) button or key 51 that is utilized to activate the certain function, such as those associated with defining geometric constraints.

The preferred RENAISSANCE 8:8:8™ system includes software that is operative for controlling the image source and destination, and reading and storing frame numbers in association with user-defined scene identifiers or names. Thus, the system can display scene lists that facilitate the user in associating scene identifiers or names with selected frames from the scenes. In addition, the system includes control circuitry responsive to a house clock for triggering frame buffers and other video signal control devices to synchronize multiple video signals simultaneously under the system's control. This allows multiple versions of the same scene, such as modified and unmodified versions, to be synchronized for simultaneous display or combined processing.

The control panel 25 also includes a joyball panel 53, which includes knobs, a trackball 54 for manipulating a cursor, keys for source setup, primary color balance, color grabbing, trackball control, and other effects control. When the windows feature of the present invention is activated, movement of the trackball 54 causes generation of a cursor 60 that is displayed on the video monitor 40. The cursor 60 is utilized to manipulate and select portions of video images displayed on the monitor, as will be described.

Finally, the control panel 25 includes a soft panel 57, which contains knobs and softkeys for dedicated 6-color secondary enhancement, special effects control, dedicated memory keys, and other functions not forming a part of the present invention. In accordance with the invention, the control panel 25 includes features to facilitate primary color correction and secondary color correction region isolation, the definition of geometric constraints, and the definition of multiple sets of primary color correction parameters (e.g., one for regions inside a geometric constraint and one for regions outside the constraint). These and other parameters may be set and stored in memory by manipulation of controls on the soft panel 57.

The color correction system 30 includes several circuit boards that perform the functions required to carry out color correction and other types of image processing in digital color images, and to control input from the image source 32 and utilization or storage in the utilization device 42. These circuits include a real time controller (RTC) circuit 70 with network interface that provides a data communication network interface to the data communication network 22 coupling the color correction system 30 to the workstation 12 and color correction system control panel 25.

The real time controller (RTC) 70 includes a dedicated microprocessor for handling real time events. Real time events occur at the rate of one every 30 millisecond (ms), so as to maintain an event rate corresponding to at least a 33 frames per second (fps) display rate. The RTC 70 receives an events list via the data communications network 22 to control various functions of the system, for example providing a set of color corrections for each frame of a specified scene. In particular, the events list includes a data structure that identifies a particular frame number and scene number, information that specifies one or more sets of color correction parameters for the selected frame, hue-domain information for isolating color correction regions, information defining one or more geometric constraints for the frame, information identifying which color corrections are associated with which hue-domain region and geometric constraint, and so forth.

The events list is a data structure having frame numbers as a time reference. The data structure includes a sequence of data blocks in which each block is related to a beginning frame number and an ending frame number. Each block is called a "scene," which typically corresponds to a continuous segment of film or video shots. Each block also contains a set of color correction parameters, hue-domain isolation parameters, and geometric constraint information for the frame.

A user definable windows (UDW) generator board 75 includes a dedicated high speed microprocessor that converts vectorized user-defined windows into a video matte or geometric constraint on a real time basis at the real time event rate. The RTC circuit 70 provides the vector representations of the windows to the UDW board 75 at the real time event rate.

A key frame buffer (KFB) circuit board 78 stores a video image from the image source 32, or from any other digital storage system, in a high speed memory. This image is then utilized to derive a vector representation of any user defined windows. Keys for vectorizing may be obtained directly from the image source 32, or may be retrieved from pre-stored images stored in the memory of the workstation 12.

Color correction equipment 80 carries out digital color correction and other video parameter adjustment functions associated with the color correction system 30. The block in FIG. 1 identified as the color correction equipment 80, which includes all of the remaining functions of the preferred RENAISSANCE 8:8:8™ digital color correction system 30, is described in greater detail with reference to FIGS. 2–14. Briefly, the color correction equipment 80 receives color correction parameters that define the coefficients of a transformation matrix or "T-matrix" that is applied to an input R,G,B, signal to produce a color corrected output R,G,B signal. The input R,G,B signal and the output R,G,B signal from the T-matrix process are combined within an "alpha mixer" that restricts that application of the color corrections defined in the T-matrix to color correction regions defined in the hue-domain through hue, saturation, and luminance qualification curves. The hue, saturation, and luminance qualification curves are non-additively combined to produce a total qualification curve. An additional alpha filter may further modify the total qualification curve to produce the final alpha qualification curve that is applied by the alpha mixer. For a given pixel, the output color value is computed as a weighted sum of the input color value and the corrected color value, where the alpha qualifier (i.e., a point on the alpha qualification curve) defines the weighting coefficients.

Thus, the preferred color correction system 30 is operative to receive video images from an image source such as telecine 32, digitize the video images, capture a digitized image in the KFB board 78, display the captured image on the video monitor 40, receive color corrections entered by the colorist or operator via the control panel 25, impose these color corrections upon video images as they are transferred through the system, and provided corrected output signals via the output board 35. These output signals are employed or stored in a utilization device 42 and/or simultaneously displayed on the video monitor 40.

In carrying out the operations for applying image processing to an input video signal, a system operator or colorist interacts with the system through the control panel 25, and via the user interface elements of the workstation 12, including the keyboard 20, mouse 18, graphics tablet 19, and workstation monitor 15. In particular, the workstation 12 executes computer programs for carrying out the computer-implemented methods described in this specification, and generates displays on the monitor 15 windows containing user interface elements, such as informational displays, control buttons, slider bars, data entry fields, image display areas, etc.

The reader should be careful here to distinguish user-interface "windows" displayed on the monitor 15 generated from execution of computer software for carrying out the invention, from the "user-defined windows" for applying image processing. During system use, the workstation monitor 15 typically displays one or more user-interface windows for carrying out the methods as described herein. One such user-interface window is a control window 44, which includes a display of various buttons and slider controls for manipulation of the key image. Activation of certain commands causes the display of other, secondary windows. One of the secondary windows is a View/Edit Window 46, shown overlapping the control window 44 in FIG. 1. The View/Edit Window 46 is used to display a captured image in greater detail, and to provide certain additional user controls specifically associated with editing of the image.

It should be noted that the video image displayed in the video monitor 40 can be displayed within a defined View/Edit window 46 if desired. Since the images provided from the image source are digitized for processing in the preferred RENAISSANCE 8:8:8™ processing system, the system can readily generate digitized video images and provide them in an appropriate format, such as Apple Computer's Quicktime™ video format, MPEG I or II, or other digital video format via the network 22 to the workstation 12. Accordingly, any of the displays that are described as being shown on the video monitor 40 can alternatively be displayed on the workstation monitor 15. Furthermore, any of the functions or displays described in conjunction with the video monitor 40 can also be supplied in a window in the workstation display 15.

It is to be expected that, as more and more image processing of film and video is conducted in the digital domain as opposed to the traditional analog domain, methods of the present invention will be utilized in strictly digital systems for image storage, retrieval, manipulation, display, and output. In the disclosed embodiment, however, the results of image processing are viewed on a conventional analog video monitor 40, while the user interface and controls aspects of the image processing and the invention are carried out through the workstation 12 and its associated monitor 15.

Overview of Color Correction Methodology

Figure 2:
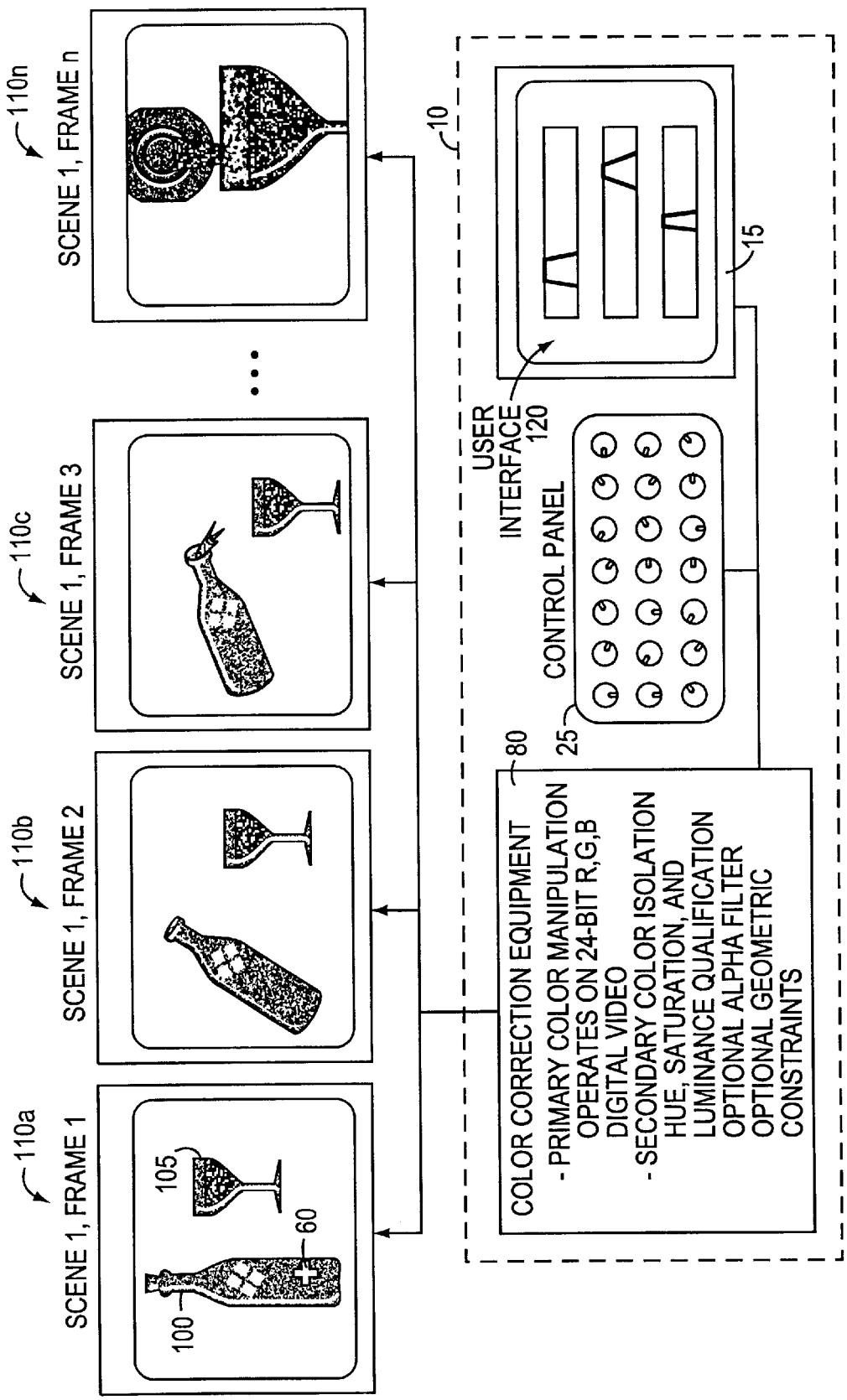
FIG. 2 is a schematic block diagram illustrating the use of an image processing system for implementing color correction isolation using secondary color parameters.

FIG. 2 is a schematic block diagram illustrating the use of the image processing system 10 for implementing color correction region isolation using secondary color parameters. FIG. 2 illustrates the system 10 after the colorist has selected an input image including a scene from the image source 32 to receive color correction. The colorist has also selected a particular target frame of the scene to receive manual color correction. For the example shown in FIG. 2, the frames 110*a–n* define the scene and the frame 110*a* is the target frame that the colorist has selected for manual adjustment. As the colorist adjusts the target frame 110*a,* this frame is typically displayed on the video monitor 40 while a color correction user interface 120 is displayed on the workstation display 15. The color correction user interface 120 is described in greater detail with reference to FIGS. 5 and 6A–B.

The colorist operates the various controls of the image processing system 10, represented by the control panel 25, to manually enter color corrections for the selected frame 110*a*. This process includes isolating color correction regions within the input image, defining color correction parameters that establish the corrected colors for the color correction regions, and defining an alpha qualification curve, which is a smoothing function for blending the input color values with the corrected colors selected by the colorist. Once the colorist is satisfied with the color corrections for the selected frame 110*a,* the color correction equipment 80 automatically applies these color corrections to the remaining scenes of the frame without the colorist having to manually adjust each frame of the scene.

As noted previously, automatically isolating a color correction region presents a difficult technical problem because the region of interest typically changes in size, shape, location, and/or geometry over the frames in a scene. For example, in the example shown in FIG. 2, a bottle 100 is lifted, tilted, moved toward a glass 105, turned toward the viewer, and then further tilted to pour the contents of the bottle into a glass. In this scene, the geometry of the bottle 100 changes from a side view of the bottle to a top view of the bottle. The bottle also changes in location and size over the several frames of the scene. The color correction equipment 80 implements an improved method for automatic color correction region isolation over the frames of the scene so that the color corrections defined by the colorist for the selected frame 110*a* are properly applied to the remaining scenes of the frame.

The image processing system 10 typically receives image data from the image source 32 in a primary color domain, such as 24-bit R,G,B or in the format specified by CCIR Recommendation No. 601-1. Isolating color correction regions by manipulating the primary color domain parameters, however, often produces unsatisfactory results. For this reason, color correction systems may apply color corrections by transforming the source image into a secondary color domain, applying color correction parameters in the secondary color domain, and then transforming the corrected image back to the primary color domain. In particular, the R,G,B source image may be linearly transformed into the hue domain, which includes hue, saturation, and luminance parameters. The relationship between color values in the primary color domain and in the hue domain is described in greater detail with reference to FIG. 3.

But applying color corrections in the hue domain is computationally expensive and often introduces color artifacts into the color corrected image. The color correction equipment 80 within the system 10 avoids this problem by isolating color correction regions using qualification curves defined the hue domain. The color correction parameters for these regions, however, are defined in the primary color domain. The qualification curves also serve as smoothing functions for blending the input color values with the color correction parameters selected by the colorist. That is, the qualification curves are non-additively combined, optionally with an additional alpha filter, to produce an alpha qualification curve that the color correction equipment 80 uses to blend the input image with the color correction parameters selected by the colorist. The color correction equipment 80 performs the blending operation, which is referred to as "alpha mixing," using the input color values and the corrected color values in the primary color domain.

To define a color correction region, the colorist places the cursor 60 on a sample of the selected frame 110*a*. This sample may be a single pixel or a number of pixels that the color correction equipment 80 averages to obtain a representative set of color values. In either case, the sample may be represented by a set of color parameters preferably expressed by the hue domain parameters hue, luminance, and saturation. These color parameters for the sample are then displayed within the user interface 120 on the workstation display 15. The user interface 120 allows the colorist to define a hue qualification curve about the hue of the sample, a saturation qualification curve about the saturation of the sample, and a luminance qualification about the luminance of the sample, as represented by the three trapezoidal curves shown on the user interface 120.

The colorist uses the control panel 25 to select corrected color values for the sample and to manipulate the qualification curves as desired. The colorist may also use the control panel 25 to define an additional alpha filter and a geometric constraint for the selected sample. The result of the color corrections entered by the colorist for the target frame 110*a* is typically displayed on the video display 40.

The colorist may then repeat the process for another sample of the target frame 110*a* until all of the desired color correction have been entered, or until all of the color correction channels available in the system 10 are occupied. Once the colorist is satisfied with the color corrections for the target frame 110*a,* the color correction equipment 80 automatically applies these color corrections to the remaining scenes of the frame. The colorist repeats this process as needed to create a color corrected master film or video tape that reflects multiple color adjustments to multiple frames in multiple scenes.

Relationship Between Primary and Secondary Color Domains

Figure 3:
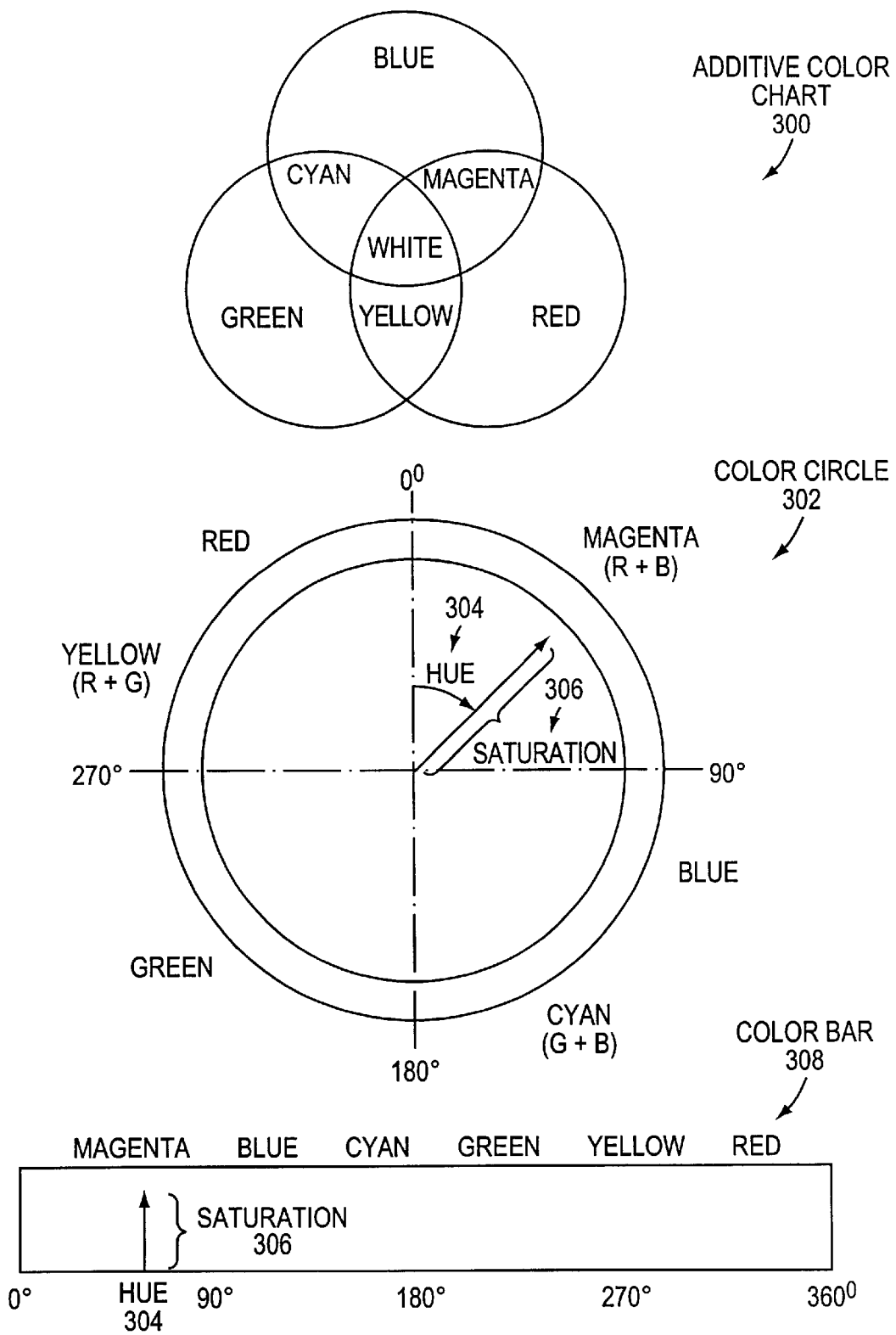
FIG. 3 (prior art) is a diagram illustrating the relationship between the additive primary colors, a color wheel, and a color bar.

FIG. 3 (prior art) is a diagram 300 illustrating the relationship between the additive primary colors, a color wheel, and a color bar. Video display and projection systems typically operate using the additive primary colors, red, green, and blue. For example, a typical 24-bit color value in the primary color domain includes an 8-bit red parameter, an 8-bit green parameter, and an 8-bit blue parameter. These three color parameters may be combined in varying intensities to produce 256 different color values. When all three primary colors are combined in full intensity, they produce the whitest color that the device displaying the signal can produce. The absence of all three primary colors produces the blackest color that the device displaying the signal can produce. Between these two extremes, the three primary colors in equal proportions produce various shades of gray, depending on the intensity of the primary color constituents. Non-equal proportions of the primary colors produce all of the other colors that the device displaying the signal can produce. For example, red and green may be combined in equal proportions to produce yellow, green and blue may be combined in equal proportions to produce cyan, and blue and red may be combined in equal proportions to produce magenta, and so forth.

The colors of the visible spectrum may be plotted in increasing wavelength (decreasing frequency) on a color circle 302, which begins in the magenta region, starting at about 400 millimicrons wavelength at zero degrees, and continues around the circle to the red region, ending at about 700 millimicrons wavelength at 360 degrees. The hue of a particular color represents the relative proportions of the primary-color constituent. As such, the hue may be represented by a particular angle 304 on the color circle 302. Just as grays may be displayed in varying intensities, so may every other hue that a display device can produce. The outer edge of the color circle 302 represents the highest-intensity value of each hue, and the center of the circle represents black or the absence of all three primary-color constituents. The relative intensity, or saturation, of a color value having a particular hue may therefore be represented as the length of a vector 306 displayed and the angle 304 representing the hue.

In some cases, it is more convenient to "roll out" the color circle 304 to produce a color bar 308, also known as a rainbow. In this color bar, the zero degree point of the color circle 302 is typically displayed at the left edge of the color bar, and the 360 degree point is typically displayed at the right edge of the color bar. Thus, the color bar 308 extends horizontally, from left to right, beginning in the magenta region at about 400 millimicrons wavelength, and ending in the red region at about 700 millimicrons wavelength. The hue 304 of a color value may therefore be represented as a horizontal position along the color bar 308. In addition, the height of the color bar 308 represents the saturation scale, with black at the bottom of the bar and the full-intensity values at the top of the bar. This allows the saturation 306 of a color value to be represented by the height of a vector displayed at the horizontal position representing the hue.

Figure 4:
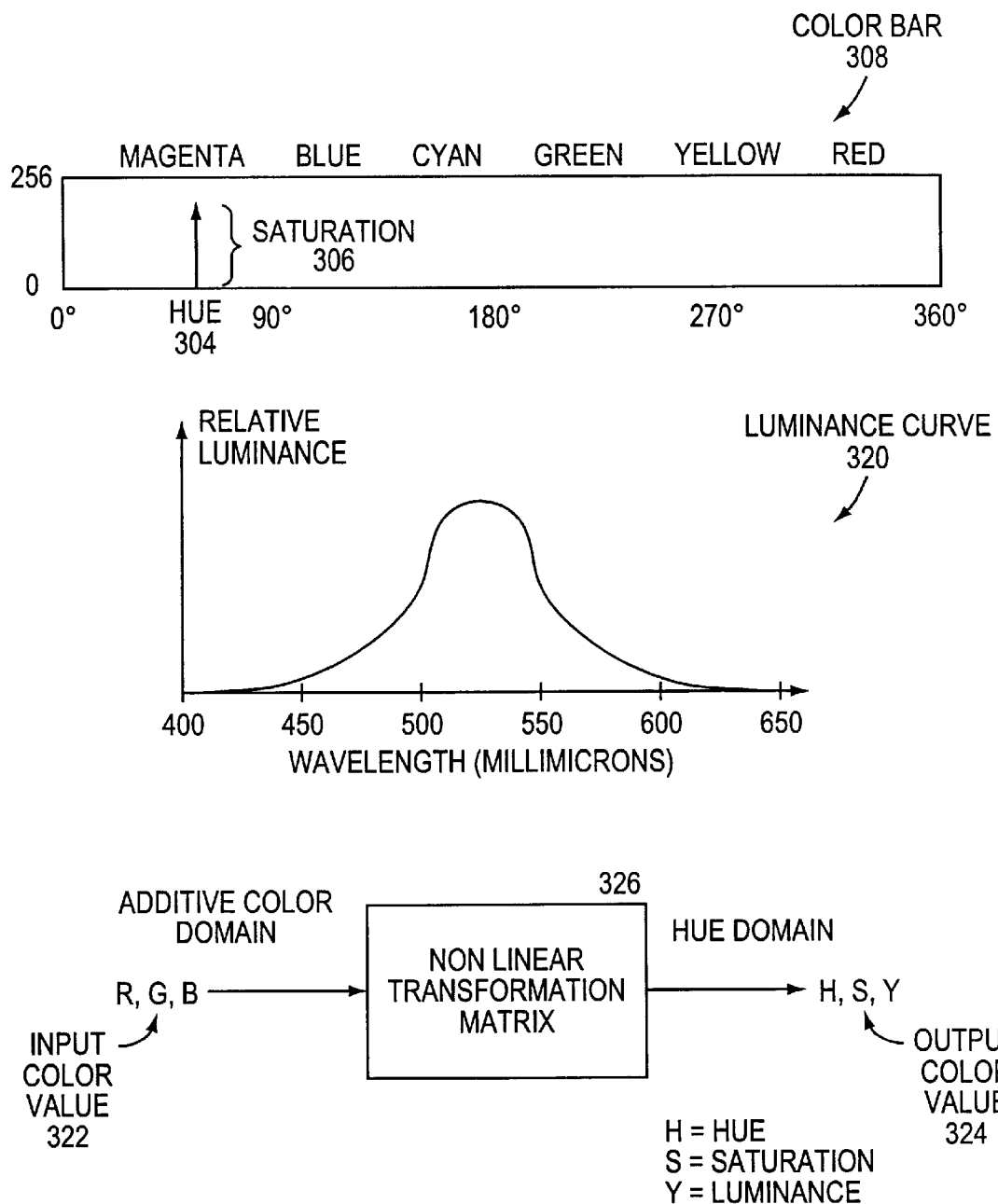
FIG. 4 (prior art) is a diagram illustrating the relationship between color parameters in the primary color domain and in the hue domain.

FIG. 4 (prior art) is a diagram illustrating the relationship between color values in the primary color domain and in the hue domain. In addition to the hue 304 (represented as "H") and the saturation 306 (represented as "S"), an R,G,B color value in the primary color domain also reflects a third parameter, luminance (represented as "Y"), which along with the hue and the saturation fully represent the color value in the hue domain. The concept of luminance involves the relative brightness of the various colors of the visible spectrum as perceived by the human eye. This phenomenon is represented by the luminance curve 320 shown in FIG. 4. Although the luminance curve 320 shown in FIG. 4 is not intended to be precisely accurate, it is indicative of the approximate shape of the actual luminance curve, which can be found in any number of generally available text books that describe color correction technology.

An R,G,B color value 322 in the primary color domain may be transformed into an H,S,Y color value 342 in the hue domain through the application of the linear transformation matrix 326. That is, the H,S,Y color parameters can be computed as weighted sums of the R,G,B color parameters, and vice versa. Those skilled in the color correction art are familiar with computing techniques for transforming R,G,B color values to H,S,Y color values, and then converting the H,S,Y color values back to R,G,B color values. Unlike prior image processing systems, however, the image processing system 80 takes advantage of this fluidity of color value representation to implement color correction region isolation in the hue domain, while mixing input color values and color in the primary color domain.

Color Correction User Interface

Figure 5:
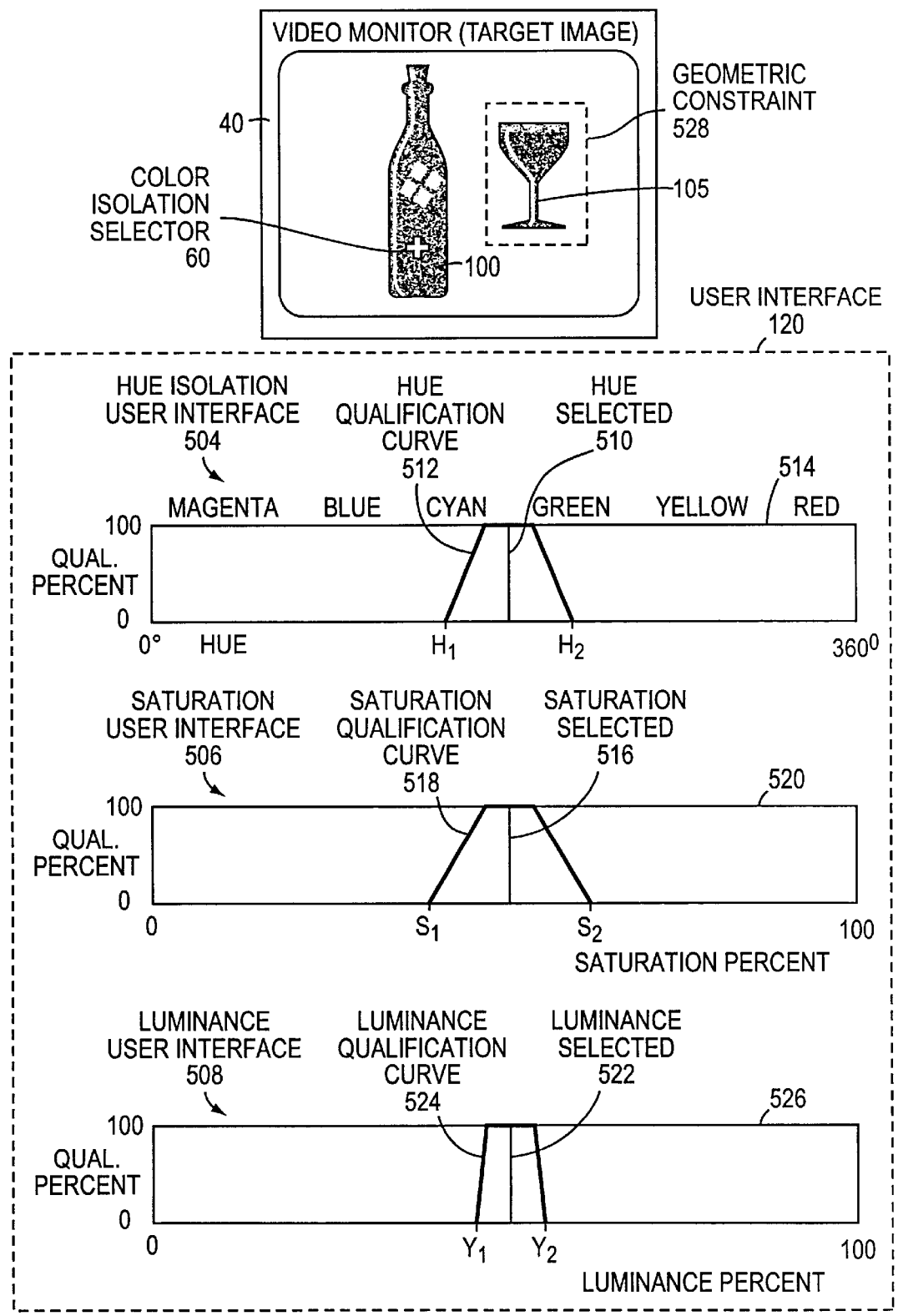
FIG. 5 is a diagram illustrating a user interface for a color correction system.

FIG. 5 is a diagram illustrating the user interface 120 of FIG. 2 in greater detail. In the example illustrated in FIG. 2, the video monitor 40 displays the target image, which is the selected frame 110a of the scene that the colorist is in the process of color correcting. The colorist defines a color correction region by first placing the cursor 60 over a sample of the target image. This selection causes the workstation monitor 15 to display the user interface 120, which includes a hue isolation user interface 504, a saturation user interface 506, and a luminance user interface 508.

The hue isolation user interface 504 displays the selected hue 510 (i.e., the hue of the sample) within a hue qualification curve 512. The selected hue and the hue qualification curve 512 are displayed within a color bar 514 of the type described with reference to FIG. 3. The color bar 514 preferably shows the various colors represented by the bar, and for this reason is often referred to as the rainbow. The height of the color bar represents the percent qualification with respect to the hue qualification curve 512. The workstation monitor 15 typically illustrates only a portion of the color bar 514, and the colorist may scroll the display of the workstation monitor 15 to the left or right to cause a different portion of the color bar to appear on the monitor.

The hue qualification curve 512 is generally trapezoidal in shape and defines, at least in part, a hue sector in which color correction parameters will be applied. The colorist selects a corrected color for the hue sector and may alter both the shape the of the hue qualification curve 512 and its position along the color bar 514. The corrected color value selected by the colorist corresponds to the color correction parameters. Specifically, the color correction parameters are the coefficients of a transformation matrix, referred to as the "T-matrix," that converts the input color value to the corrected color value. That is, the input color value multiplied by the "T" matrix" produces the corrected color value selected by the colorist.

The saturation isolation user interface 506 displays the selected saturation 516 (i.e., the saturation of the sample) within a saturation qualification curve 518. The selected saturation 516 and the saturation qualification curve 518 are displayed within a saturation bar 520 having the percent saturation increasing from left to right in the horizontal direction, and the percent qualification increasing from bottom to top in the vertical direction. The saturation qualification curve 518 is generally trapezoidal in shape and also contributes to the definition of the hue sector in which color correction may be applied. The colorist may alter both the shape the of the saturation qualification curve 518 and its position along the saturation bar 520.

In similar fashion, the luminance isolation user interface 508 displays the selected luminance 522 (i.e., the luminance of the sample) within a luminance qualification curve 524. The selected luminance 522 and the luminance qualification curve 524 are displayed within a luminance bar 526 having the percent luminance increasing from left to right in the horizontal direction, and the percent qualification increasing from bottom to top in the vertical direction. The luminance qualification curve 524 is generally trapezoidal in shape and also contributes to the definition of the hue sector in which color correction may be applied. The colorist may alter both the shape the of the luminance qualification curve 524 and its position along the luminance bar 526.

Because the workstation monitor 15 displays the hue spectrum within the color bar 514 while the video monitor 40 displays the target image, the combined displays assist the colorist in selecting a hue sector that captures a particular object included in the target image while avoiding other objects that may have similar, but perceptibly different, hues. In addition, the colorist may preview the effect of the selected color correction on the target frame 110a displayed on the video monitor 40. In other words, the colorist may toggle the display shown on the video monitor 40 between the unprocessed input image and a processed image for the scene 110a to gauge the effect of the selected color correction.

As mentioned previously, color correction region isolation is performed in the hue domain, while the color correction itself is performed in the primary-color domain. A particular pixel having an R,G,B color value has a corresponding H,S,Y color value. The hue parameter (H) has a non-zero hue qualifier (i.e., qualification percent) ($\alpha_h$) if it is between H1 and H2 as shown in the hue isolation user interface 504. The hue qualifier ($\alpha_h$) may typically be determined through reference to a look-up table that contains the hue qualification curve 512. Similarly, the saturation parameter (S) has a non-zero saturation qualifier ($\alpha_h$) if it is between S1 and S2 as shown in the saturation isolation user interface 506. The saturation qualifier ($\alpha_s$) may also be determined through reference to a look-up table that contains the saturation qualification curve 518. And the luminance parameter (Y) has a non-zero luminance qualifier ($\alpha_y$) if it is between Y1 and Y2 as shown in the luminance isolation user interface 508. The luminance qualifier ($\alpha_y$) may also be determined through reference to a look-up table that contains the luminance qualification curve 524.

The hue qualification percent or qualifier ($\alpha_h$), the saturation qualifier ($\alpha_s$), and the luminance qualifier ($\alpha_y$) may by non-additively combined, for example by multiplying the three percentages together, to obtain a total alpha qualifier ($\alpha_t$) for the particular pixel. The total alpha qualifier ($\alpha_t$) may be further modified by an optional alpha filter qualification percentage to produce a final alpha qualifier ($\alpha$) for the pixel. The final alpha qualifier ($\alpha$) is a value between zero and 100 percent that determines the relative portions of the input color value ($R_{in}$,$G_{in}$,$B_{in}$) and the corrected color value (R',G',B') in the output pixel, where ($\alpha$) represents the relative contribution of the corrected color value and (1-$\alpha$) represents the relative contribution of the input color value. For example, if the final alpha qualifier ($\alpha$) is equal to 75%, the color value of the output pixel ($R_{out}$,$G_{out}$,$B_{out}$) is determined by the following alpha-mixing formula:

$$R_{out}=0.75*R'+0.25*R_{in}$$

$$G_{out}=0.75*G'+0.25*G_{in}$$

$$B_{out}=0.75*B'+0.25*B_{in}$$

Thus, the final alpha qualifier ($\alpha$) is used to determine the weighting parameters for blending the input color parameters with the corrected color parameters by computing the output color parameters as weighted sums of the primary-color domain color parameters. This type of color blending, referred to as "alpha mixing," permits smoothing of the color correction, or a gradual reduction in the amount of color correction applied at the edges of the hue sectors. That is, the output signal, which may be a blend of the input signal and the corrected color values, typically includes increasing amounts of the input signal as the hue-domain color parameters diverge from the hue, saturation, and luminance values of the sample pixels under the cursor. The amounts of the input signal and the corrected color values included in the output signal is defined by the alpha qualifier. As the colorist may define hue, saturation, and luminance qualification curves independently, the color blend at the edges of the hue sector may be based on hue, saturation or luminance, or a combination of these parameters. An additional alpha filter may further influence the alpha qualifier.

As an additional option, the colorist may define a geometric constraint, represented by the constraint 528 shown in FIG. 5, in addition to the hue-domain color correction region isolation parameters (i.e., the hue, saturation, and luminance qualification curves) described above. The geometric constraint allows color correction to be limited to a portion of each frame of the scene being processed, where the limited portion is defined with respect to the geometric constraint. For the example shown in FIG. 5, the color correction defined for the bottle 100 may be applied to each entire frame except the portion within the constraint 502. This approach prevents color corrections intended to affect only the bottle 100 from also affecting the glass 105.

Thus, the geometric constraint 528 allows the colorist to limit the automatic application of color correction to a defined portion of the frame area, over the several frames of a scene. Geometric constraints therefore increase the ability of the color correction equipment 80 to isolate discrete objects for color correction. In particular, the colorist may use a geometric constraint to exclude from color correction discrete objects that have a similar color to a target object. In the example shown in FIG. 5, the bottle 100 is the target object and the geometric constraint 528 prevents a color correction intended for the bottle 100 from also affecting the color of the glass 105, which may have a similar color.

Figure 6A:
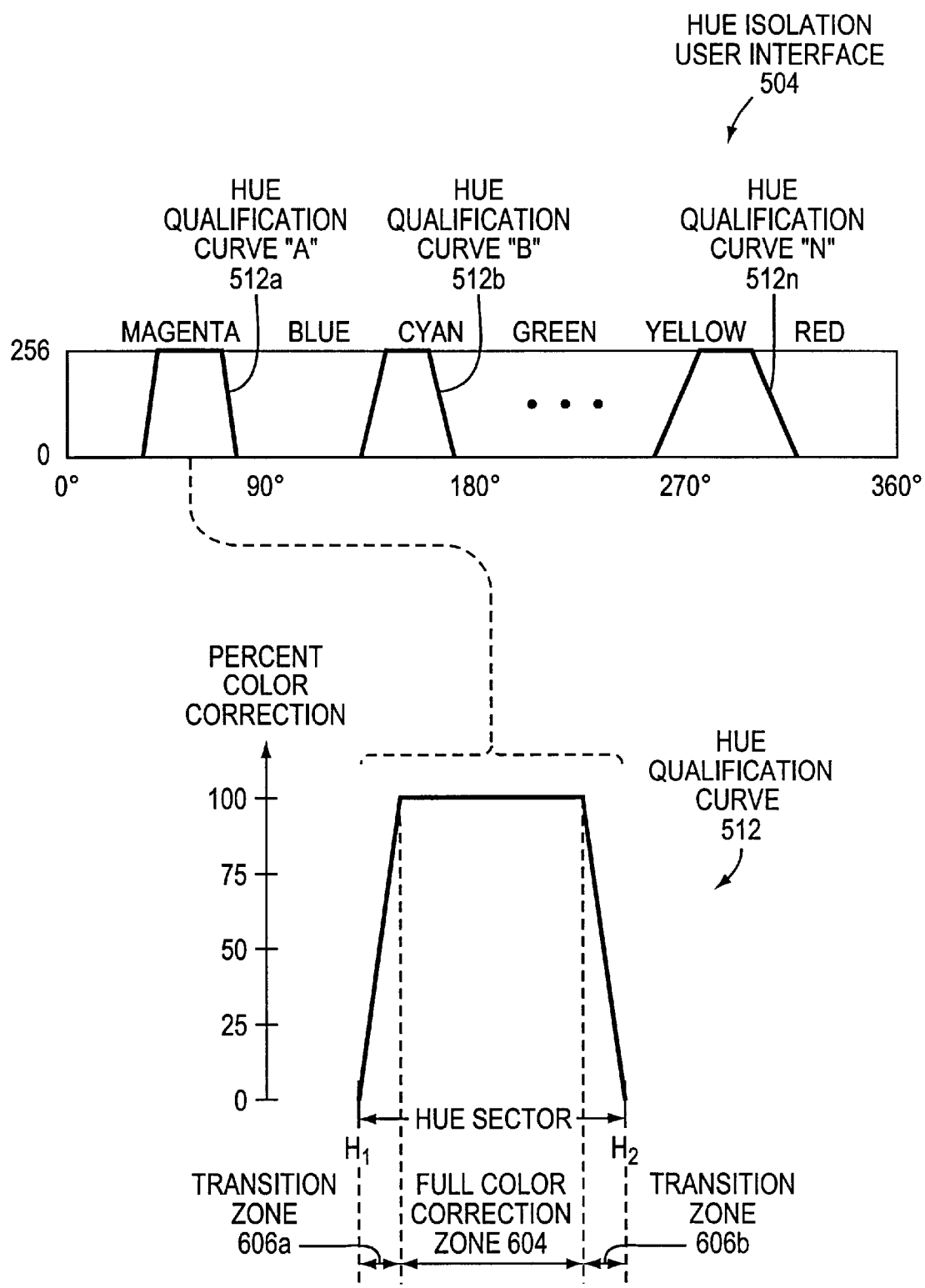
FIG. 6A is a diagram illustrating a portion of the user interface of FIG. 5 in greater detail.

FIG. 6A is a diagram illustrating a portion of the hue isolation user interface 504 in greater detail. The slope of the rising and falling edges of the hue qualification curve 512 defines the softness of the color correction. The hue qualification curve 512 typically includes a full color correction zone 604 at the center of the curve, and sloped rising and falling edges toward the outer edges of the hue sector. These sloped edges define transition zones 606a and 606b towards the edges of the hue sector. In the full color correction zone 604, the colors of the output signal are equal to the corrected color values (i.e., the color values of input signal are completely replaced by the corrected color values). For the transition zones 606a and 606b, the input color values are mixed with the corrected color values in a percentage equal to the hue qualifier ($\alpha_h$), which the percent qualification determined by reference to the hue qualification curve 512.

Each of the qualification curves 512, 518, and 524 may be shaped as shown for the representative hue qualification curve 512. In addition, any of the qualification curves 512, 518, and 524 may be set equal to the value "one" for its entire horizontal range to effectively remove qualification for the corresponding color parameter. Thus, the color correction equipment 80 allows the colorist to use hue qualification, saturation qualification, or luminance qualification individually to select color correction regions. In addition, more then one qualification curve may be applied simultaneously to define a color correction region.

The color correction equipment 80 is typically configured as one or more color correction blocks in which each block may be used to define up to sixteen non-overlapping hue sectors or color correction channels. Accordingly, the hue isolation user interface 504 typically displays a number of hue qualification curves 512a–n, each corresponding to one of the available color correction channels. The display shown on the workstation monitor 15 typically tracks the active channel automatically so that the hue qualification curve corresponding to a channel selected by the colorist automatically appears in the center of the workstation monitor 15.

Figure 6B:
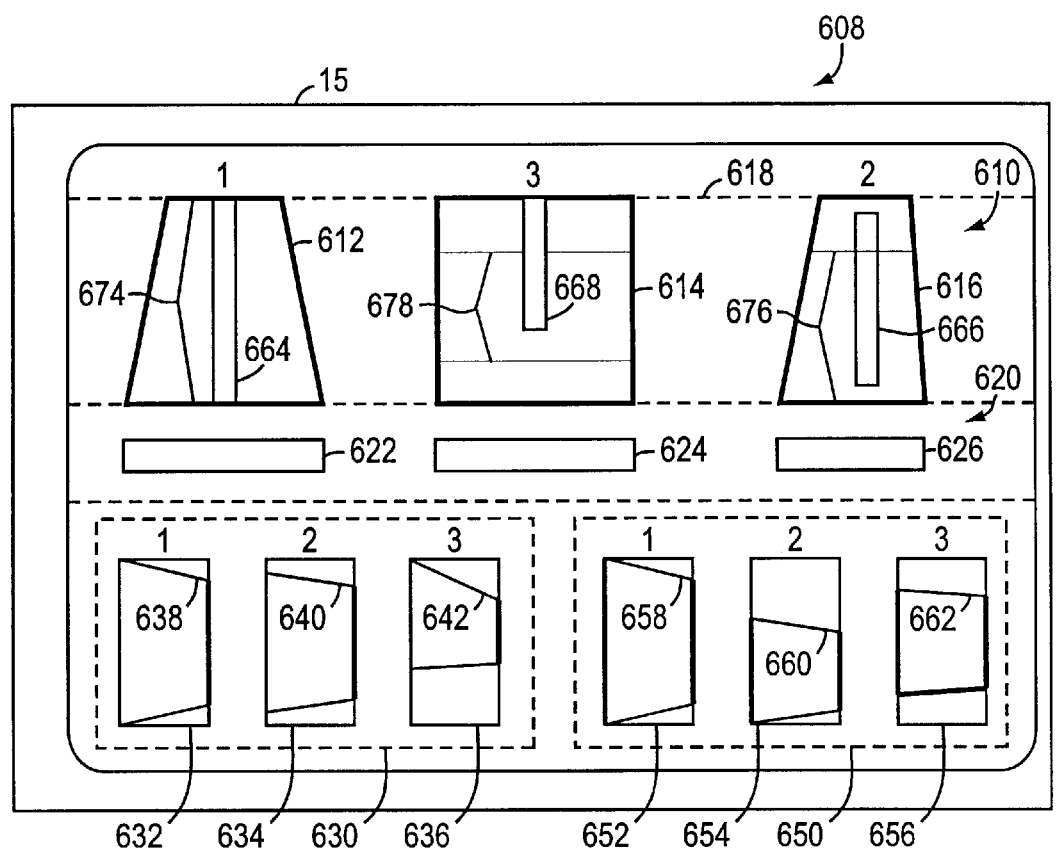
FIG. 6B is a diagram illustrating an alternative user interface for a color correction system.

FIG. 6B is a diagram illustrating an alternative user interface 608 for operating the color correction equipment 80. The user interface 608 collapses the saturation user interface 506 and the luminance user interface 508 into compact visual elements that are conveniently shown in conjunction with their corresponding hue qualification curve. The top of the user interface 608 includes a hue qualification display 610, which is shown in this example as having three hue qualification curves 612, 614, and 616 displayed against the background of a color bar 618 of the type described with reference to FIG. 3. Recall that each color correction block typically includes up to sixteen color correction channels. To illustrate a typical scenario by taking the hue qualification curves 612, 614, and 616 from left to right, the first hue qualification curve 612 may correspond to the first color correction channel (numbered "1"), the second hue qualification curve 614 may correspond to the third color correction channel (numbered "3"), and the third hue qualification curve 616 may correspond to the second color correction channel (numbered "2").

FIG. 6B shows the hue qualification curves out of order with respect to the numbering of the color correction channels because the colorist may assign the color correction channels in any order (e.g., by assigning different channels to different samples of the target frame 110a), whereas the hue qualification display 610 displays the hue qualification curves in hue order along the underlying color bar 618 or rainbow. The hue qualification curves are, therefore, superimposed against the color bar 618 to show the color of their respective hue sectors at a glance. The curves are clearly labeled with their respective color correction channel numbers so that the colorist can determine which controls will affect which hue qualification curve. This type of display allows the colorist to scroll left and right along the color bar 618 to see the various hue qualification curves, and their associated color correction channel numbers, in their respective positions along the color bar 618. As noted previously, the colorist may alter the position and shape of each hue qualification curve individually.

A hue-shift display 620 is located beneath the hue qualification display 610. The hue-shift display 620 includes a first color correction block 622 located directly below the first hue qualification curve 612. The width of the first color correction block 622 is equal to the width of the first hue qualification curve 612, which sets the width of the hue sector for color correction channel number one. The color correction block 622 displays the corrected color for color correction channel number one. The corrected color is the output color value selected by the colorist for input color values that produce a final alpha qualifier ($\alpha$) equal to 100 percent. With reference to the previously-defined alpha-mixing formula, the color correction block 622 displays the corrected color value (R',G',B') for color correction channel number one.

Similarly, the hue-shift display 620 includes a second color correction block 624 located directly below the second hue qualification curve 614. The width of the second color correction block 624 is equal to the width of the second hue qualification curve 614, which sets the width of the hue sector for color correction channel number three. The color correction block 624 displays the corrected color value (R',G',B') for color correction channel number three. And the hue-shift display 620 includes a third color correction block 626 located directly below the third hue qualification curve 616. The width of the third color correction block 626 is equal to the width of the third hue qualification curve 616, which sets the width of the hue sector for color correction channel number two. As with the other blocks, the color correction block 626 displays the corrected color value (R',G',B') for color correction channel number two.

The color correction user interface 608 also includes a luminance display 630 on the left-half portion of the interface below the hue-shift display 620. The luminance display 630 includes three control windows 632, 634, and 636. Each of these control windows may display a luminance qualification curve for a particular color correction channel, as determined by the colorist. For example, the colorist may assign the first luminance control window 632 to color correction channel number one, the second luminance control window 634 to color correction channel number two, and the third luminance control window 636 to color correction channel number three.

With these assignments, the first luminance control window 652 displays a luminance qualification curve 638 for color correction channel number one, the second luminance control window 634 displays a luminance qualification curve 640 for color correction channel number two, and the third luminance control window 636 displays a luminance qualification curve 642 for color correction channel number three. The colorist may manipulate each of these luminance qualification curves individually. Note that each luminance qualification curve is rotated 90 degrees with respect to the luminance qualification curve 518 shown in FIG. 5, so that the percent luminance increases from top to bottom in the vertical direction, and the percent qualification increases from left to right in the horizontal direction.

The color correction channel numbers determine which luminance qualification curve shown in the luminance display 630 corresponds to which hue qualification curve shown in the hue qualification display 610. In fact, the luminance display 630 may show luminance qualification curves that correspond to hue qualification curves that are not displayed within the hue qualification display 610, if the colorist so desires.

The color correction user interface 608 also includes a saturation display 650 on the right-half portion of the interface below the hue-shift display 620. The saturation display 650 includes three control windows 652, 654, and 656. Each of these control windows may display a saturation qualification curve for a particular color correction channel, as determined by the colorist. For example, the colorist may assign the first saturation control window 652 to color correction channel number one, the second saturation control window 654 to color correction channel number two, and the third saturation control window 656 to color correction channel number three.

With these assignments, the first saturation control window 652 displays a saturation qualification curve 658 for color correction channel number one, the second control window 654 displays a saturation qualification curve 660 for color correction channel number two, and the third saturation control window 656 displays a luminance qualification curve 662 for color correction channel number three. The colorist may manipulate each of these saturation qualification curves individually. Like the luminance qualification curves, each saturation qualification curve is rotated 90 degrees with respect to the saturation qualification curve 524 shown in FIG. 5, so that the percent saturation increases from top to bottom in the vertical direction and the percent qualification increases from left to right in the horizontal direction.

Also like the luminance display 630, the color correction channel numbers determine which saturation qualification curve shown in the saturation display 650 corresponds to which hue qualification curve shown in the qualification display 610. Again, the saturation display 650 may show saturation qualification curves that correspond to hue qualification curves that are not displayed within the qualification display 610, if the colorist so desires.

To allow the colorist to ascertain all of the qualification information associated with a particular color correction channel from a single display, the hue qualification display 610 includes luminance- and saturation-related display elements that are shown in association with their corresponding hue qualification curves. This allows the colorist to view all of the qualification information by scrolling left and right along the color bar 618 to display the hue qualification curves with their corresponding luminance- and saturation-related display elements for the various color correction channels. The colorist may then stop at any point along the color bar 618, assign one of the luminance or saturation control windows to a particular color control channel, typically a displayed channel, and adjust the luminance or saturation qualification curves as desired.

Specifically, the luminance qualification curves 638, 640, and 642 each have an associated luminance display element (664, 666, and 668 respectively) that is shown in connection with the corresponding hue qualification curve (612, 616, and 614 respectively). Each luminance display element is a narrow band shown approximately in the center of its corresponding hue qualification curve, which typically is the hue position of a sample of the target image selected by the colorist. For each luminance display element, the percent luminance increases in the vertical direction over the height of the color bar 618. Thus, the vertical extent of each luminance display element visually represents the luminance range covered by the corresponding luminance qualification curve. In addition, the percent luminance is preferably shown visually within the band. That is, the luminance display element contains the hue of the underlying color (i.e., the hue corresponding to the horizontal position of the luminance display element along the color bar 618) with varying luminance. In other words, the luminance of the hue shown within the luminance display element increases vertically from bottom to top across the luminance display element.

In addition, the saturation qualification curves 658, 660, and 662 each have an associated saturation display element (674, 676, and 678 respectively) that is shown in connection with the corresponding hue qualification curve (612, 616, and 614 respectively). Each saturation display element includes two horizontal lines across the corresponding hue qualification curve, although lines occurring at the top or bottom of the color bar 618 may not be shown for convenience. As the color bar 618 shows the rainbow in increasing saturation vertically across the color bar, the horizontal lines of saturation display elements visually represents the vertical extent of the saturation range covered by the corresponding saturation qualification curve.

Although the luminance display 630 and the saturation display 650 shown in FIG. 6B depict the luminance and saturation qualification curves as trapezoids, those skilled in the art will appreciate that other types of figures could equivalently communicate the relevant information to the colorist. For example, the displays could show only the slope of the rising and falling edges (i.e., the transition zones) of a qualification curve. That is, the portion of the qualification curve that is equal to one (i.e., the full qualification zone) need not be displayed. This type display showing only the transition zones of a qualification curve would communicate all of the relevant information regarding the curve to the colorist, who would know that the qualification curve is equal to one in the region between the transition zones.

Color Correction Methodology

Figure 7:
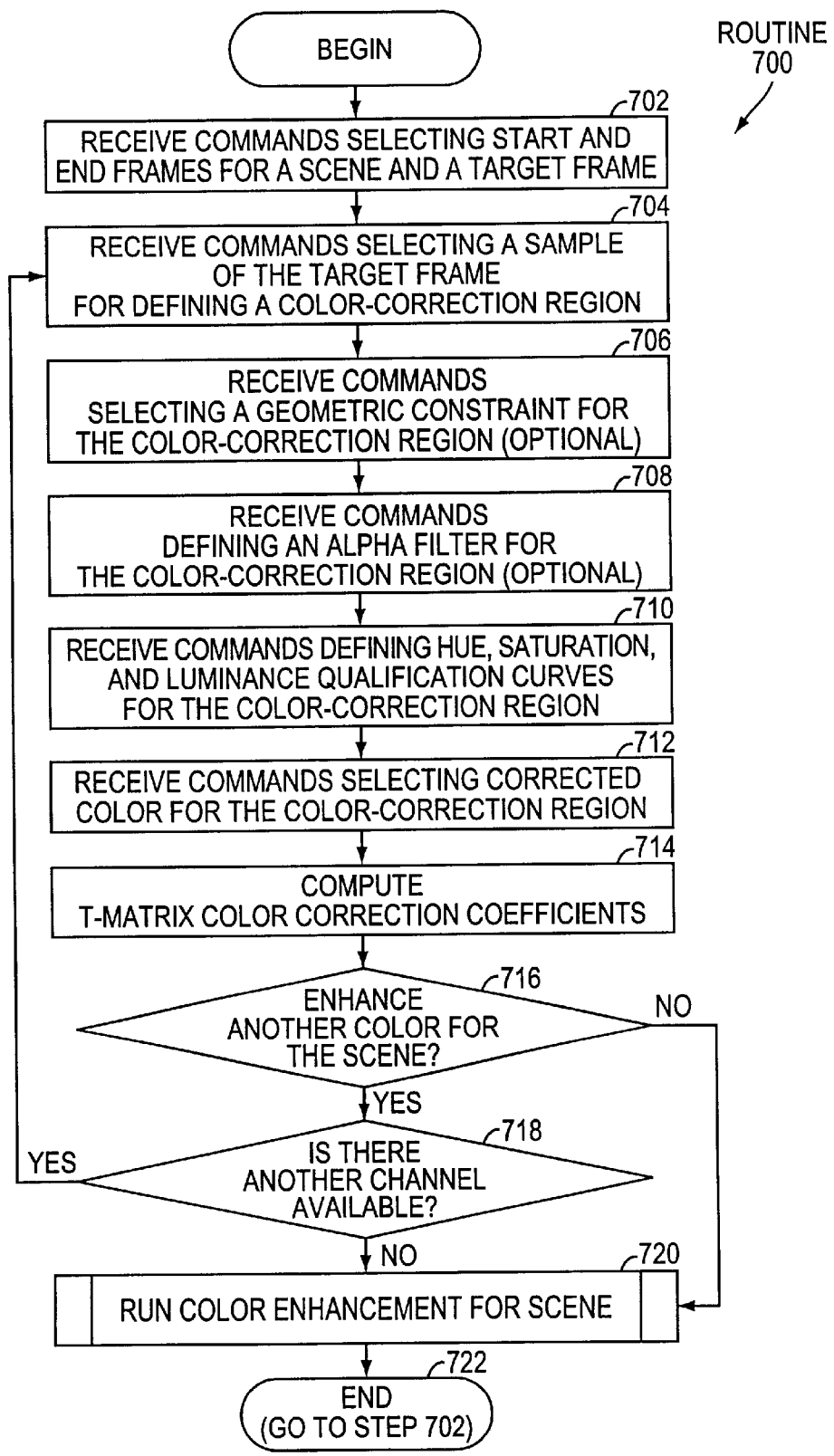
FIG. 7 is a logic flow diagram illustrating a method for operating a color correction system.

FIG. 7 is a logic flow diagram illustrating a routine 700 for operating the color correction equipment 80. Throughout the description of routine 700, the commands received by the color correction equipment 80 are typically entered by a colorist using the various controls of the image processing system 10. In step 702, the color correction equipment 80 receives commands identifying the start and end frames of a scene of a video image to receive color correction. Also in step 702, the color correction equipment 80 receives a command selecting one of the frames of the scenes as a target frame to receive manual color corrections. The color correction equipment 80 automatically applies the color corrections entered for the target frame to the other frames of the scene, as described below.

Step 702 is followed by step 704, in which the color correction equipment 80 receives commands selecting a sample of the target frame. The sample is used as a starting point for defining a color correction region. Step 704 is followed by an optional step 706, in which the color correction equipment 80 may receive a command defining a geometric constraint within the target frame. The geometric constraint is used to Limit the application of color correction associated with the color correction region to a portion of the frames of the scene defined with respect to the geometric constraint. For example, color correction may only be applied on the inside, or alternative on the outside, of the geometric constraint within each frame of the scene.

Step 706 is followed by another optional step 708, in which the color correction equipment 80 receives a command defining an alpha filter. An alpha filter is a qualification curve that modifies the total alpha curve to produce a final alpha qualification curve for the color correction region. The total alpha curve is the product of the hue, saturation, and luminance qualification curve defined for the color correction region. The color correction equipment 80 typically operates on a pixel-by-pixel basis by multiplying the alpha filter qualifier for a given pixel by the total alpha qualifier for the pixel to obtain the final alpha qualifier. The final alpha qualifier is then passed to an alpha mixer for use in blending the input color value for the pixel with the corrected color value selected for the pixel by the colorist. Each of these qualification curves is typically trapezoidal in shape, although other filter shapes, such as square, bell-shaped, and so forth may be used.

Step 708 is followed by step 710, in which the color correction equipment 80 receives commands defining the hue, saturation, and luminance qualification curves for the color correction region. The colorist may manipulate each of these qualification curves independently. Step 710 is followed by step 712, in which the color correction equipment 80 receives commands defining the corrected color values for the color correction region. Step 712 is followed by step 714, in which the color correction equipment 80 computes the coefficients of a transformation matrix, known as the "T-matrix," which is used to produce an unqualified color corrected image. The alpha mixer mentioned above blends the color values of an input image with the color values of an unqualified color corrected image in accordance with the final alpha qualification curve to product a qualified, color-corrected output image. The "T-matrix" and the alpha mixer are further described with reference to FIG. 12. The mathematics associated with the "T-matrix" is described with reference to FIG. 13.

Steps 704 through 712 provide the color correction equipment 80 with information for applying color correction to a particular color correction region. These steps, of course, may be performed in a different order that is shown in routine 700, and a colorist may repeat any or all of the steps as desired. The color correction information created in steps 704 through 714 occupies one color correction channel of the color correction equipment 80. As described previously with reference to FIG. 6A, the color correction equipment 80 typically includes one or more color correction blocks that each provide up to sixteen non-overlapping color correction channels. Thus, the colorist may repeat steps 704 through 714 for additional color correction channels.

Accordingly, in step 716, the color correction equipment 80 receives commands indicating whether the colorist intends to enter color correction information for another color correction region, and thus occupy another color correction channel. If the colorist intends to enter color correction information for another color correction region, the "YES" branch is followed from step 716 to step 718, in which the color correction equipment 80 determines whether another color correction channel is available. If another color correction channel is available, the "YES" branch is followed from step 718 to step 704, and the color correction equipment 80 receives color correction information for another color correction channel.

If the colorist does not intend to enter color correction information for another color correction region, the "NO" branch is followed from step 716 to routine 720, in which the color correction equipment 80 applies the color corrections defined for the target frame to the other frames of the scene. Similarly, if there is not another color correction channel available in the color correction equipment 80, the "NO" branch is followed from step 718 to routine 720, which is described below with reference to FIG. 8. Routine 720 is followed by the "END" step, which preferably loops to step 702 so that routine 700 may be repeated for another scene in the motion picture or other video program that the colorist is working on.

Routine 700 thus allows the color correction equipment 80 to receive color correction information for a number of color correction channels, each of which corresponds to a non-overlapping color correction region defined in the hue domain. Each color correction region is ultimately defined by a final alpha qualification curve, which the color correction equipment 80 uses as a mixing function to blend the color values of the input images with the color values of unqualified color corrected images in the primary-color domain. Routine 700 may be repeated as needed to create a color corrected master film or video tape that reflects multiple color adjustments to multiple frames in multiple scenes. In the general case, multiple color adjustments may be applied to all of the frames of a motion picture or other video program.

Figure 8:
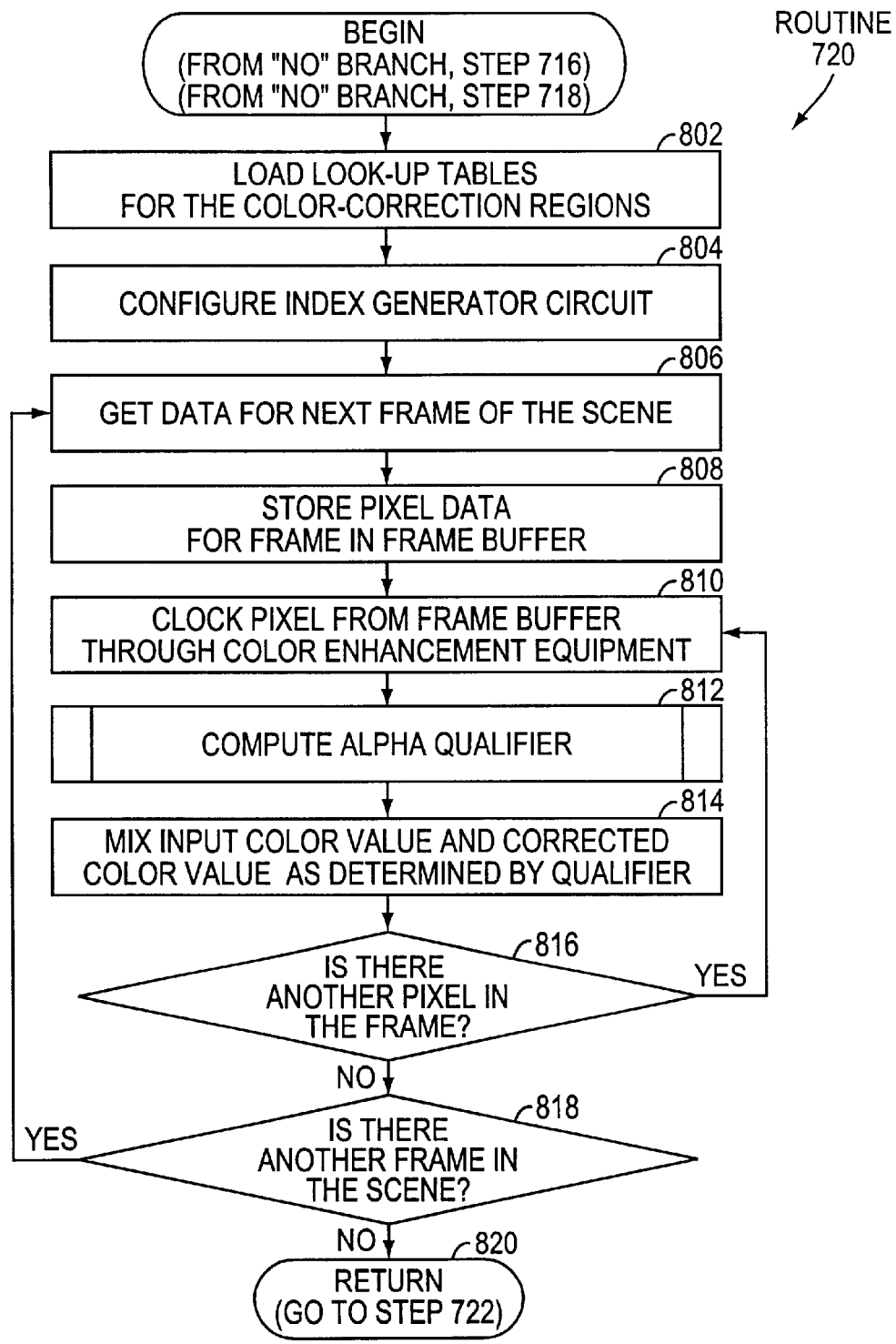
FIG. 8 is a logic flow diagram illustrating a routine for automatically applying color corrections defined for a target frame of a scene to the other frames of the scene.

FIG. 8 is a logic flow diagram illustrating routine 720 for automatically applying color corrections defined for a target frame of a scene to the other frames of the scene. Routine 720 follows the "NO" branches from steps 716 and 718 shown in FIG. 7. In step 802, the color correction equipment 80 loads look-up tables for the color correction regions defined by the colorist during routine 700. This is equivalent to saying that the color correction equipment 80 loads look-up tables for each color correction channel; and the color correction equipment 80 receives the data for the look-up tables through controls operated by the colorist, as described in routine 700.

Step 802 is followed by step 804, in which the color correction equipment 80 configures the index generator circuit. Step 804 is followed by step 806, in which the color correction equipment 80 gets the R,G,B color values for a frame of the scene to be color corrected. Step 806 is followed by step 808, in which the color correction equipment 80 loads the color values for the frame into a frame buffer, from which the pixels will be passed, one by one, through color enhancement equipment, which is preferably constructed using programmable logic units (PLUs), field-programmable gate arrays (FPGAs), or other types of reprogrammable parallel-processing hardware. Thus, the color enhancement equipment typically applies color correction on a pixel-by-pixel basis as the pixels pass through the circuitry of the color enhancement equipment.

Step 808 is followed by step 810, in which the color correction equipment 80 clocks a pixel from the frame buffer through the color enhancement equipment. Step 810 is followed by routine 812, in which the color correction equipment 80 computes a final alpha qualifier for the current pixel. Routine 812 is described with reference to FIG. 9. Routine 812 is followed by step 814, in which the color correction equipment 80 blends the input color value for the current pixel with the corrected color value for the current pixel in accordance with the final alpha qualifier for the current pixel. That is, the color correction equipment 80 applies color correction to the primary-color domain value for the current pixel. This mixing operation, which is performed by the alpha mixer, is described with reference to FIG. 13A.

Step 814 is followed by step 816, in which the color correction equipment 80 determines whether there is another pixel in the current frame to process. If there is another pixel in the current frame to process, the "YES" branch loops to step 810, in which the color correction equipment 80 clocks the next pixel from the frame buffer through the color enhancement equipment. If there is not another pixel in the current frame to process, the "NO" branch is followed to step 818, in which the color correction equipment 80 determines whether there is another frame in the scene to process. If there is another frame in the scene to process, the "YES" branch loops to step 806, in which the color correction equipment 80 gets the color values for the next frame of the scene. If there is not another frame in the scene to process, the "NO" branch is followed to the "RETURN" step 820, which returns to step 722 shown in FIG. 7. Routine 720 thus process each pixel of each frame of the scene.

Figure 9:
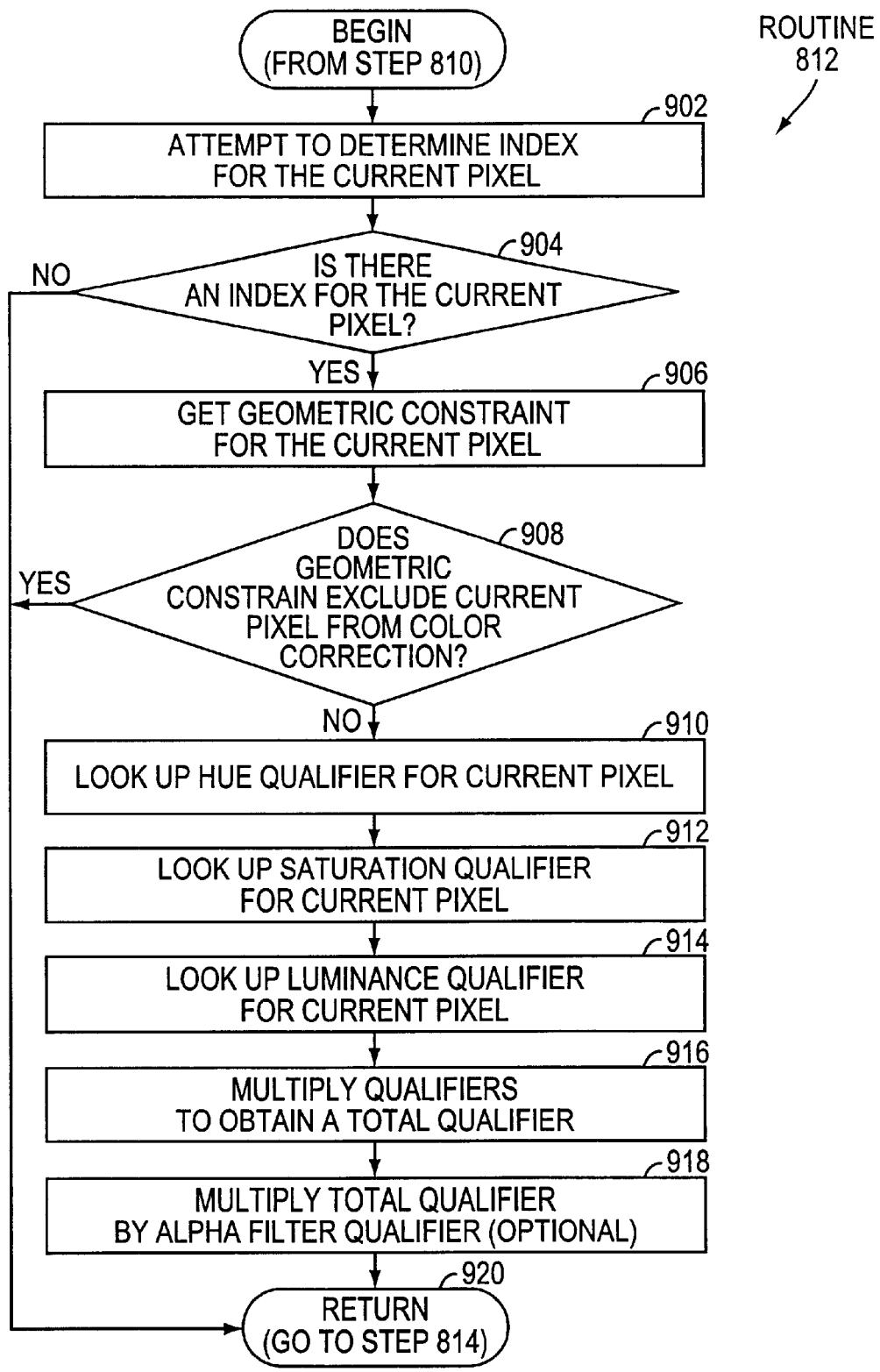
FIG. 9 is a logic flow diagram illustrating a routine for computing a color correction qualifier for color enhancing a video scene.

FIG. 9 is a logic flow diagram illustrating routine 812 for computing a final alpha qualifier for the current pixel. Routine 812 follows step 810 shown in FIG. 8. As a prerequisite to routine 812, the color correction equipment 80 transforms the R,G,B primary-color-domain value for the pixel into an H,S,Y hue-domain color value. The color correction equipment 80 then performs the operations of routine 812 on the hue-domain color value. In other words, the color correction equipment 80 performs color correction region isolation, as defined by routine 812, in the hue domain.

In step 902, the color correction equipment 80 attempts to determine an index number associated with the current pixel. The color correction equipment 80 uses the hue parameter (H) to determine whether the pixel occurs within a color correction region defined during routine 700. The index number identifies the hue sector or color correction channel associated with the current pixel. If the hue of the current pixel falls within one of the hue sectors, the color correction equipment 80 determines an index number that identifies the hue-sector or color correction channel for the pixel. The index number is then used to access the hue, saturation, and luminance qualification curves associated with the pixel's color correction channel. The index number may also be used to access an optional geometric constraint and an optional alpha filter associated with the pixel's color correction channel.

Step 902 is followed by step 904, in which the color correction equipment 80 determines whether it successfully identified an index number for the current pixel. Stated differently, the color correction equipment 80 determine whether the pixel occurs within a color correction region defined during routine 700. If the color correction equipment 80 did not successfully identify an index number for the current pixel, no color correction should be performed for the current pixel, and the "NO" branch jumps to the "RETURN" step 920.

If the color correction equipment 80 did successfully identify an index number for the current pixel, the "YES" branch is followed to step 906, in which the color correction equipment 80 gets a geometric constraint defined for the pixel's color correction channel. The geometric constraint allows the colorist to limit the automatic application of color correction to a defined portion of the frame area. Typically, the geometric constraint tells the color correction equipment 80 to apply color correction only for pixels occurring inside, or alternatively outside, the constraint. Geometric constraints therefore increase the system's ability to isolate discrete objects for color correction.

Step 906 is followed by step 908, in which the color correction equipment 80 determines whether the geometric constraint excludes the current pixel from color correction. If the geometric constraint excludes the current pixel from color correction, the "YES" branch jumps to the "RETURN" step 920. If the geometric constraint does not exclude the current pixel from color correction, the "NO" branch is followed from step 908 to step 910, in which the color correction equipment 80 looks up the hue qualifier for the current pixel. Step 910 is followed by step 912, in which the color correction equipment 80 looks up the saturation qualifier for the current pixel. Step 912 is followed by step 914, in which the color correction equipment 80 looks up the luminance qualifier for the current pixel.

Step 914 is followed by step 916, in which the color correction equipment 80 multiplies the hue, saturation, and luminance qualifiers to obtain a total qualifier for the current pixel. Step 916 is followed by step 918, in which the color correction equipment 80 looks up the an alpha-filter qualifier for the current pixel and multiplies the total qualifier and the alpha-filter qualifier to obtain a final alpha qualifier for the current pixel. Step 918 is followed by the "RETURN" step 920, which returns to step 814 shown on FIG. 4. Routine 812 thus computes a final alpha qualifier, which has a value between zero and 100 percent, for each pixel to be color corrected.

Color Correction Computer Architecture

Figure 10:
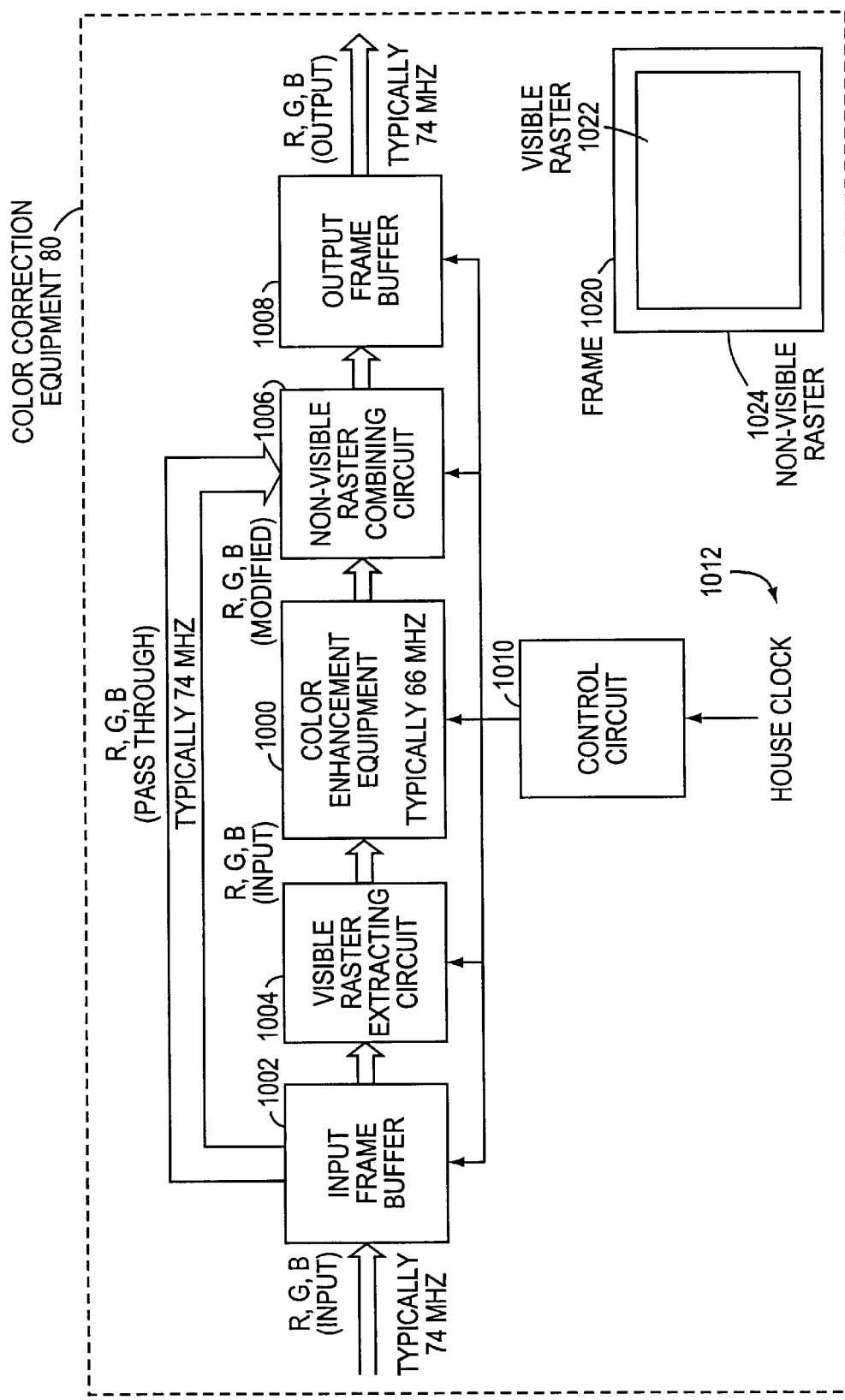
FIG. 10 is a schematic block diagram illustrating color correction equipment constructed in accordance with an illustrative embodiment of the present invention.

FIG. 10 is a schematic block diagram illustrating the color correction equipment 80, which is part of the image processing system 10 shown in FIG. 1. The color correction equipment 80 includes color enhancement equipment 1000. Any perceived difference in connotation between the terms "color correction equipment" and "color enhancement equipment" is unimportant; these terms have been selected simply to provide distinct labels for referring to different components of the color correction equipment 80. The color enhancement equipment 1000 typically operates at 66 mHz. The input video data stream, however, typically propagates at 74 mHz. The color correction equipment 80 processes a real-time video signal propagating at 74 mHz even though the color enhancement equipment 1000 operates at 66 mHz. This is possible because only a subset of the input video signal needs to be passed through the color enhancement equipment 1000.

The frame 1020 illustrates the subset of the input video signal that needs to be passed through the color enhancement equipment 1000. The frame 1020 includes a visible raster 1022 defining the image shown on a display device, such as a television screen or computer monitor. The frame 1020 also includes a non-visible portion 1024 including horizontal and vertical overscan areas, horizontal retrace intervals, a vertical blanking interval, and so forth. Only the visible raster portion 1022 of the video signal needs to be passed through the color enhancement equipment 1000. The color correction equipment 80 therefore strips the visible raster 1022 out of each frame and passes only the pixels of the visible raster through the 66 mHz color enhancement equipment 1000.

Accordingly, the color enhancement equipment 1000 includes an input frame buffer 1002 that receives and temporarily stores each frame of the input video signal. Each frame of data is then passed through a visible raster extracting circuit 1004 that extracts the visible raster portion 1022 of the frame. The visible raster portion 1022 of the frame is then passed through the color enhancement equipment 1000, where color correction is applied.

The non-visible portion 1024 of each frame bypasses the color enhancement equipment 1000 as part of an unprocessed input video data signal propagating at 74 mHz. After the color corrected visible raster 1022 exits the color enhancement equipment 1000, a non-visible raster combining circuit 1006 recombines the non-visible portion 1024 of each frame with the color corrected visible raster to construct a complete output frame of video data. The complete output frame is then passed to an output frame buffer 1008, from which the frames of the color corrected output video signal are clocked out at 74 mHz.

A control circuit 1010 uses a house clock signal 1012 to control the timing of the various components of the color correction equipment 80. The control circuit 1010 causes the color corrected visible raster to reach the non-visible raster combining circuit 1006 at effectively the same time as the unprocessed input video signal. As a result, the non-visible raster combining circuit 1006 reassembles each frame properly. Because the ratio of the data in the visible raster 1022 to the data in a complete frame 1020 is equal to or less than the ratio of the 66 mHz data propagation rate through the color enhancement equipment 1000 to the 74 mHz data propagation rate of the unprocessed input video signal (about 89%), the color correction equipment 80 can perform the required timing operation.

Figure 11:
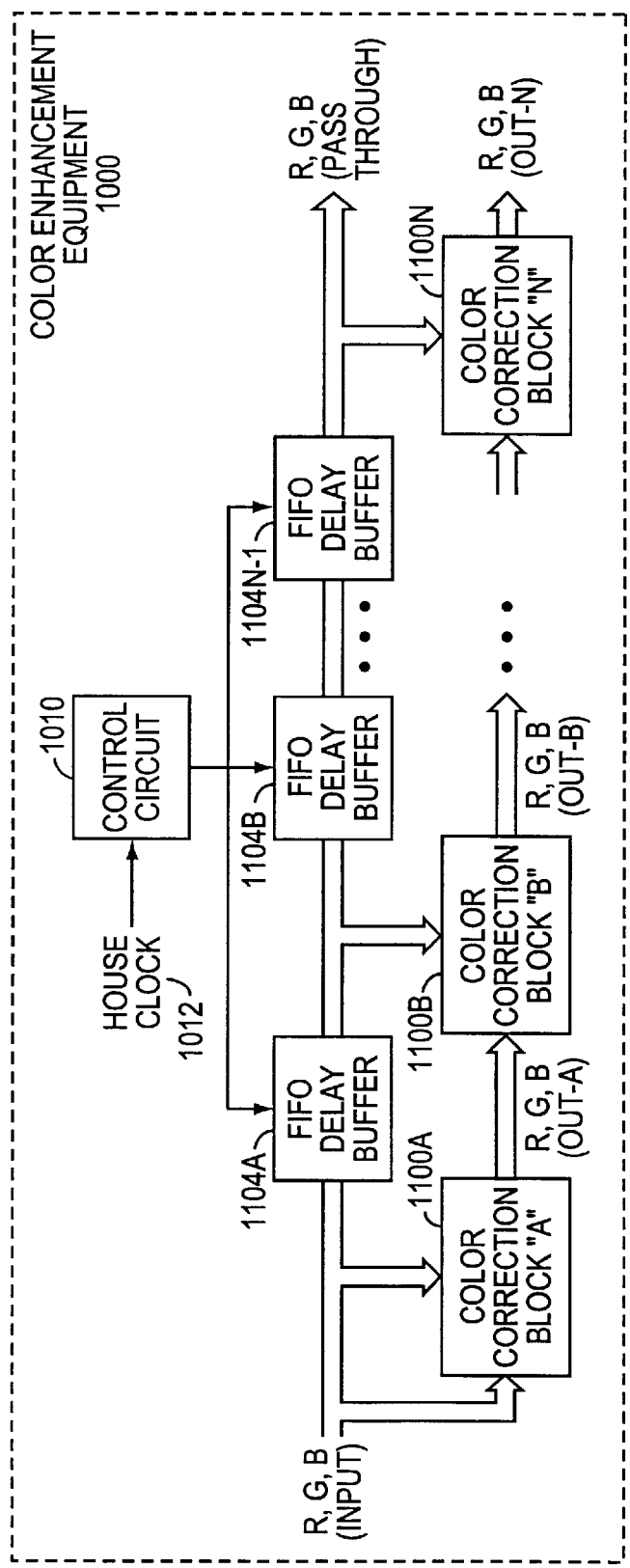
FIG. 11 is a schematic block diagram illustrating color enhancement equipment that may form a component of the color correction equipment of in FIG. 10.

FIG. 11 is a schematic block diagram illustrating the color enhancement equipment 1000, which may include a number of discrete color correction blocks 1100*a–n* arranged in series or parallel. Each color correction block typically allows a colorist to define up to sixteen non-overlapping hue sectors (i.e., color correction channels) with associated corrected color values and qualification curves. Each color correction block has two video inputs, a first input connected to the output from the previous block, and a second input connected to an unprocessed video signal. Delay buffers 1104*a–n* are positioned in the unprocessed video signal between each color correction block to synchronize the unprocessed video signal with the output video signal from the preceding color correction block. The control circuit 1010 uses the house clock signal 1012 to control the timing of delay buffers 1104*a–n* to maintain synchronism between the unprocessed video signal and processed video signal passing through the various color correction blocks 1100*a–n*.

Figure 12:
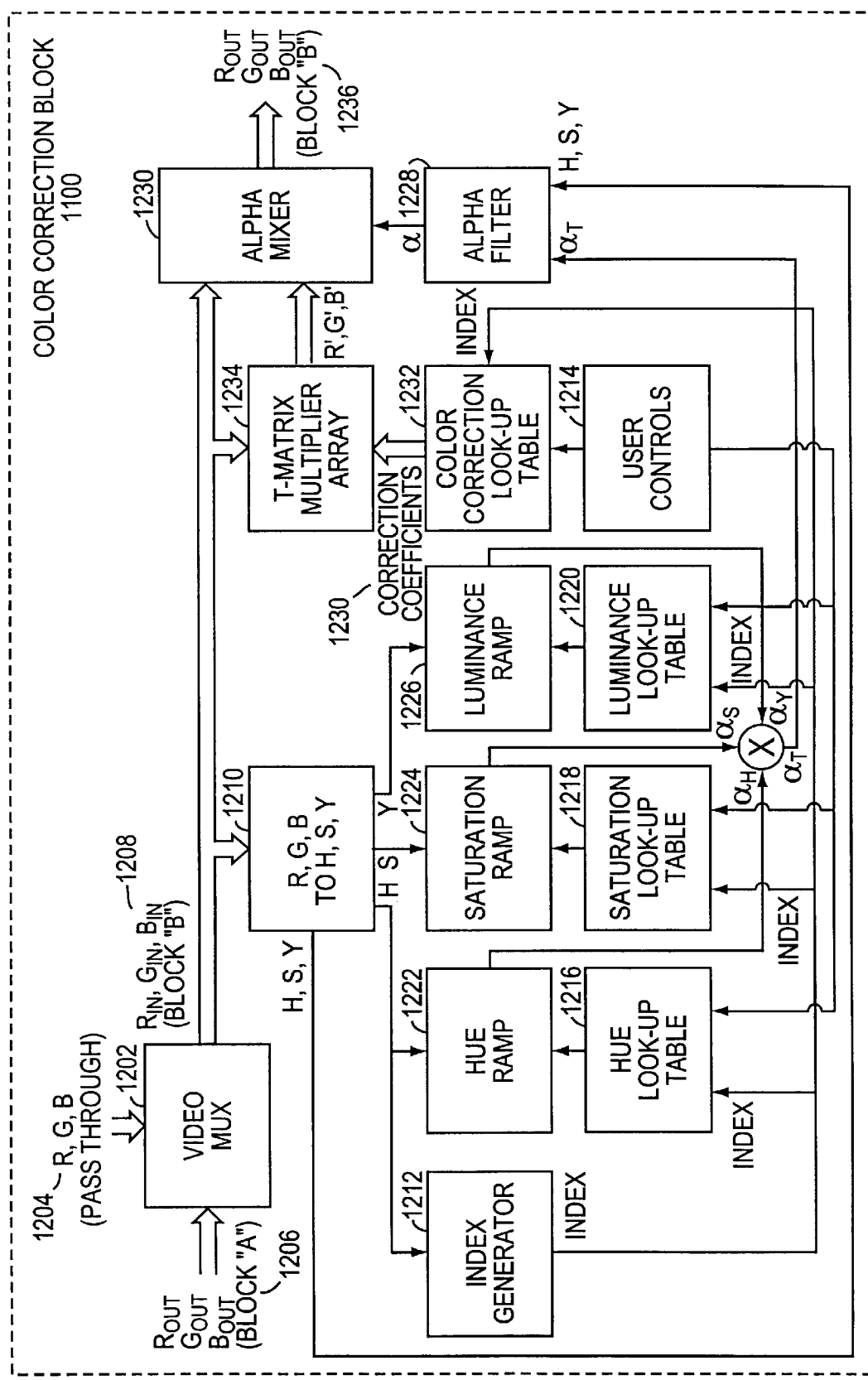
FIG. 12 is a schematic block diagram illustrating a color correction block that may form a component of the color enhancement equipment of in FIG. 11.

FIG. 12 is a schematic block diagram of a representative color correction block 1100. The color correction block 1100 includes a video multiplexer 1202 that operates as a switch allowing the colorist to select either the unprocessed video input signal 1204 or the output of the previous block 1206 as the input video signal 1208 for the block. Thus, the color correction blocks 1100a–n may be applied separately (i.e., in parallel) or in tandem (i.e., in series) for each scene processed. In addition, a particular colorist may select the number of color correction blocks 1102a–n in the system in accordance with that colorist's needs. Because the color correction blocks 1100 operate on the input video signal 1208 on a pixel-by-pixel basis, the operation of the color correction block 1100 is described below with reference to a given pixel. Each pixel of the input video signal 1208 is processed in a similar fashion.

The color correction blocks 1100 includes an R,G,B to H,S,Y transformation circuit 1210 that converts the color value for a given pixel of the input video signal 1208 from the primary color domain (R,G,B) to the hue domain (H,S,Y). Specifically, the R,G,B to H,S,Y transformation circuit 1210 computes the H,S,Y color parameters as weighted sums of the R,G,B color parameters in a manner well known to those skilled in the color correction art. The hue parameter H for the given pixel is passed to an index generator circuit 1212 that determines whether the pixel occurs within a color correction channel (i.e., hue sector) defined for the color correction block 1100. If the pixel occurs within a color correction channel defined for the color correction block 1100, the index generator circuit 1212 produces an index number identifying the pixel's color correction channel. If the pixel does not occur within a color correction channel defined for the color correction block 1100, the given pixel passes through the color correction block 1100 without any alteration. Therefore, the color correction block 1100 does not introduce color artifacts into portions of the input video signal 1208 that are not color corrected.

The index number for the given pixel identifies the proper qualification curves for the pixel. Each qualification curve is a linear relationship between percent qualification (i.e., qualifier value) and a hue-domain color parameter. If the given pixel does occur within a color correction channel defined for the color correction block 1100, the pixel's index number is passed to a hue look-up table 1216, a saturation look-up table 1218, and a luminance look-up table 1220. The look-up tables are configured with the hue qualification curves, the saturation qualification curves, and the luminance qualification curves for the various color correction channels, as controlled by a user control interface 1214.

The hue look-up table 1216, the saturation look-up table 1218, and the luminance look-up table 1220 are connected to a hue ramp 1222, a saturation ramp 1224, and a luminance ramp 1226, respectively. The hue ramp 1222 receives the hue parameter H from the R,G,B to H,S,Y transformation circuit 1210; the saturation ramp 1224 receives the saturation parameter S from the R,G,B to H,S,Y transformation circuit; and the luminance ramp 1226 receives the luminance parameter Y from the R,G,B to H,S,Y transformation circuit.

The hue qualification curve for the pixel is passed from the hue look-up table 1216 to the hue ramp 1222, which determines the hue qualifier ($\alpha_h$) for the pixel. The hue qualifier ($\alpha_h$) is a discrete number with a value between zero and 100 percent that may be ascertained from the hue qualification curve. That is, given the hue parameter H for the given pixel, the hue ramp 1222 determines the hue qualifier ($\alpha_h$) directly from the hue qualification curve. Similarly, the saturation qualification curve for the pixel is passed from the saturation look-up table 1218 to the saturation ramp 1224, which determines the saturation qualifier ($\alpha_s$) for the pixel. And the luminance qualification curve for the pixel is passed from the luminance look-up table 1220 to the luminance ramp 1226, which determines the luminance qualifier ($\alpha_y$) for the pixel.

The hue qualifier ($\alpha_h$), the saturation qualifier ($\alpha_s$), and the luminance qualifier ($\alpha_y$) are multiplied to produce a total alpha qualifier ($\alpha_t$), which is optionally passed to an alpha filter 1228. The alpha filter includes an additional qualification curve that may be defined with respect to hue, saturation, or luminance. Accordingly, any or all of the hue-domain parameters (H,S,Y) for the given pixel may be passed to the alpha filter 1228. The alpha filter determines an alpha-filter qualifier for the given pixel that is multiplied by the total alpha qualifier ($\alpha_t$) to produce the final alpha qualifier ($\alpha$). The final alpha qualifier ($\alpha$) is then passed to an alpha mixer 1230.

The user control interface 1214 also controls the configuration of a color correction look-up table 1232 that includes the coefficients of the T-matrix for the various color correction channels. The index number is passed from the index generator 1212 to the color correction look-up table 1232, which passes the color correction coefficients for the pixel's color correction channel to a T-matrix multiplier array 1234. The T-matrix multiplier array 1234 also receives the input data signal 1208, which includes the input color value ($R_{in}$, $G_{in}$, $B_{in}$) for the given pixel. The T-matrix multiplier array 1234 uses the input color value and the color correction coefficients to compute the unqualified corrected color value (R',G',B') for the pixel. The T-matrix multiplier array 1234 then passes the unqualified corrected color value to the alpha mixer 1230. The mathematics and programmable logic unit circuitry of the T-matrix multiplier array 1234 is shown in FIG. 13B.

The alpha mixer 1230 receives the input color value ($R_{in}$,$G_{in}$,$B_{in}$), the unqualified corrected color value (R',G',B'), and the final alpha qualifier ($\alpha$) for the given pixel. The alpha mixer 1230 then computes the output color value ($R_{out}$,$G_{out}$,$B_{out}$) as a weighted sum of the input color value ($R_{in}$,$G_{in}$,$B_{in}$) and the unqualified corrected color value (R',G',B'), where final alpha qualifier ($\alpha$) defines the weighting parameters, as shown in the following alpha-mixing formula:

$$R_{out}=\alpha R'+(1-\alpha)R_{in}$$

$$G_{out}=\alpha G'+(1-\alpha)G_{in}$$

$$B_{out}=\alpha B'+(1-\alpha)B_{in}$$

Figure 13A:
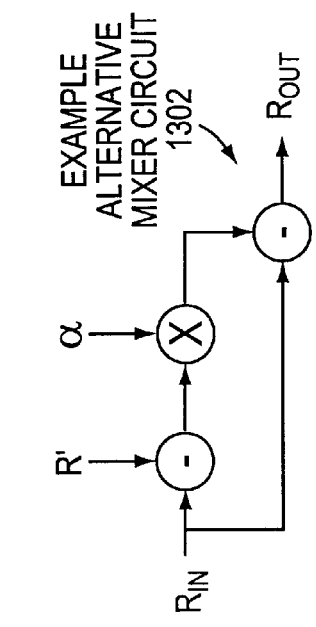
FIG. 13A is a schematic block diagram illustrating a color mixer circuit that may form a component of the color correction block shown in FIG. 12.
Figure 13A:
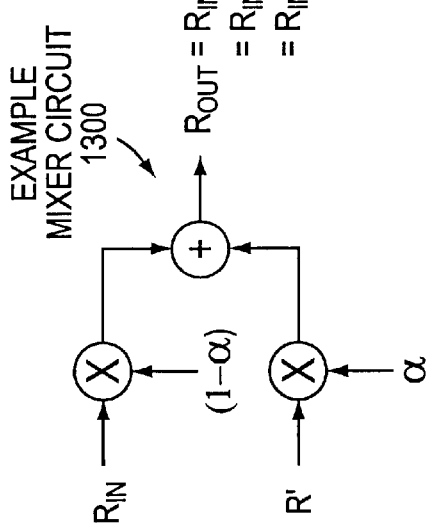
Figure 13B:
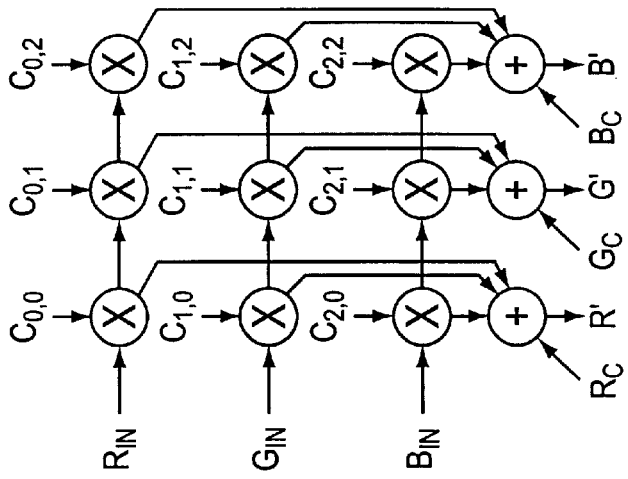
FIG. 13B is a schematic block diagram illustrating a transformation matrix circuit that may form a component of the color correction block shown in FIG. 12.

FIG. 13A is a schematic block diagram illustrating a color mixer circuit 1300 that may be implemented within the alpha mixer 1230. The color mixer circuit 1300 implements the alpha mixing formula shown above with two multipliers and one adder. In terms of programmable logic units, multipliers are more expensive than adders or subtracters. Therefore, it is advantageous to replace multipliers with adders or subtracters when possible. As shown in FIG. 13A, the alpha-mixing formula may be rearranged into a revised alpha-mixing formula that obtains the same result with one multiplication step and two subtraction steps. The alternative color mixer circuit 1302 shows the circuit for implementing the revised alpha-mixing formula using programmable logic units.

FIG. 13B is a schematic block diagram illustrating the structure of a representative T-matrix multiplication circuit 1306. The T-matrix multiplication circuit 1306 implements the T-matrix multiplication formula 1304 shown in FIG. 13B using programmable logic units.

Figure 14:
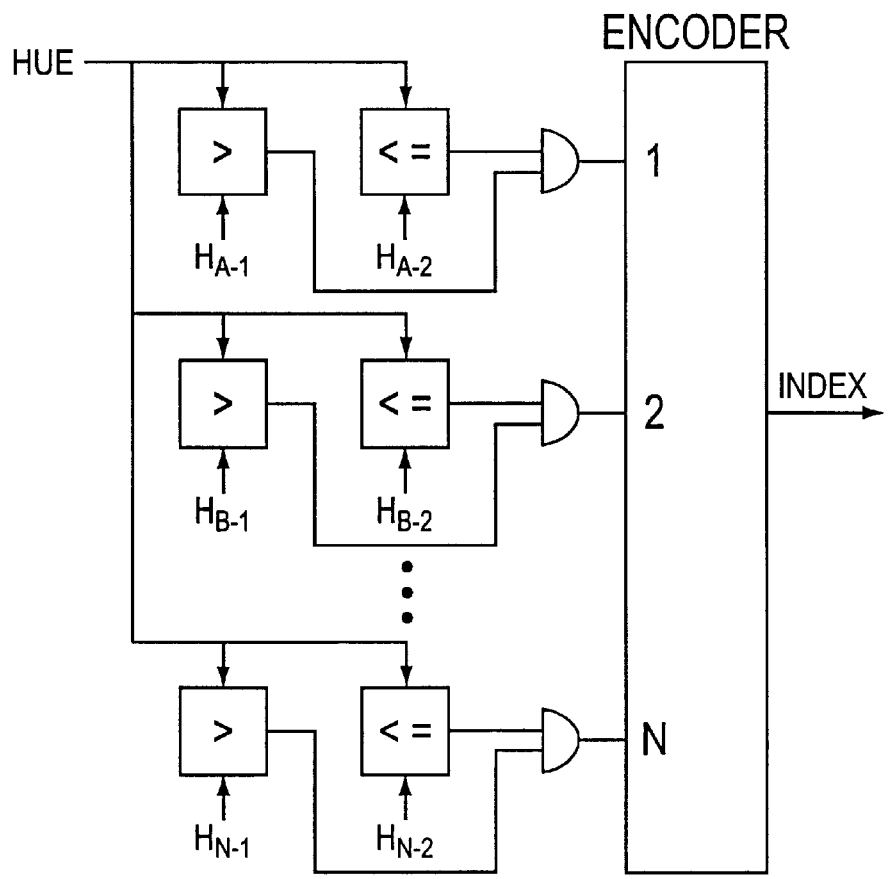
FIG. 14 is a schematic block diagram illustrating an index generator circuit that may form a component of the color correction block shown in FIG. 12.
Figure 14:
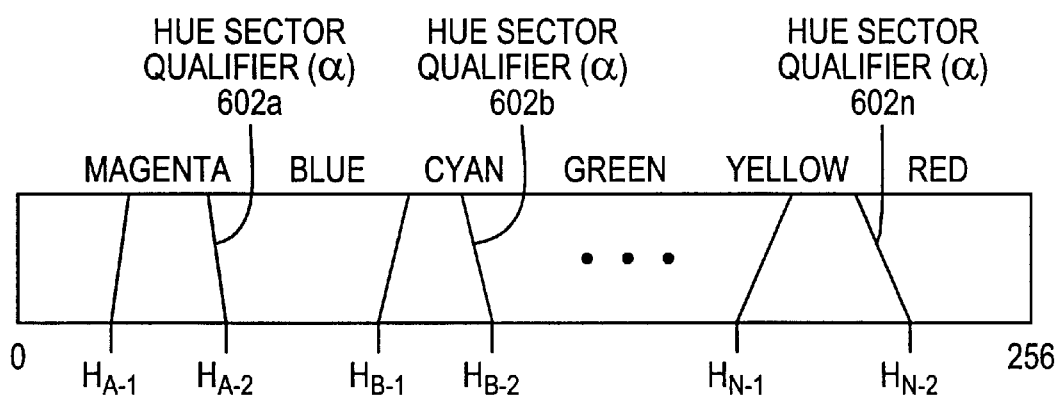

FIG. 14 is a schematic block diagram illustrating an index generator circuit 1212 implemented with programmable logic units. Each color correction channel (i.e., hue sector) is defined by two comparison blocks. A first comparison block determines whether the hue parameter H for a given pixel is greater than the lower boundary of a corresponding color correction channel. And a second comparison block determines whether the hue parameter H for the pixel is less than or equal to the upper boundary of the color correction channel. If both conditions are satisfied, the pixel falls within the corresponding color correction channel, and an encoder returns the index number for the corresponding color correction channel.

Thus, the present invention implements primary color manipulation using secondary color correction region isolation. As such, the system performs color correction in the primary color domain, which means that color data that is not manipulated passes through the system unaltered. In view of the foregoing description of the preferred embodiments of the invention, other embodiments will suggest themselves to those skilled in the art. Therefore, the scope of the present invention is to be limited only by the claims set forth below.

What is claimed is:

1. A computer-implemented method for selectively applying image processing to an image, the process carried out in a computer system coupled to an image source, comprising the steps of:

receiving an input signal from the image source in a primary color domain;

receiving a command selecting a sample of the input signal;

receiving a command identifying a color correction parameter in the primary color domain associated with the sample;

determining a hue-domain parameter associated with the sample;

defining a sector in the hue-domain about the hue-domain parameter associated with the sample;

defining a qualification curve corresponding to the sector; and mixing the input signal and the color correction parameter within the sector in accordance with the qualification curve.

2. The method of claim 1, wherein:

the hue-domain parameter is selected from the group including hue, saturation, and luminance.

3. The method of claim 1, wherein the hue-domain parameter is a first hue-domain parameter and the qualification curve is a first qualification curve, and further comprising the steps of:

determining a second hue-domain parameter associated with the sample;

defining a second qualification curve about the second hue-domain parameter;

combining the first and second qualification curves to obtain a combined qualification curve; and wherein the step of mixing the input signal comprises the step of mixing the input signal and the color correction parameter in accordance with the combined qualification curve.

4. The method of claim 3, wherein:

the first and second hue-domain parameters are selected from the group including hue, saturation, and luminance.

5. The method of claim 3, further comprising the steps of:

determining a third hue-domain parameter associated with the sample;

defining a third qualification curve about the third hue-domain parameter and corresponding to the sector;

combining the first, second, and third qualification curves to obtain a total qualification curve; and wherein the step of mixing the input signal comprises the step of mixing the input signal the color correction parameter in accordance with the total qualification curve.

6. The method of claim 1 wherein:

the first, second, and third hue-domain parameters include hue, saturation, and luminance.

7. The method of claim 5, further comprising the steps of:

applying a filter to the total qualification curve to obtain an alpha qualification curve; and wherein the step of mixing the input signal comprises the step of mixing the input signal and the color correction parameter within the sector in accordance with the alpha qualification curve.

8. The method of claim 5, further comprising the steps of:

defining a geometric constraint corresponding to the input signal; and mixing of the input signal and the color correction parameter in accordance with the geometric constraint.

9. A computer-implemented method for selectively applying image processing to a plurality of images defining a scene, the process carried out in a computer system coupled to an image source, comprising the steps of:

receiving an input signal defining the scene from the image source in a primary color domain;

receiving a command selecting a target frame of the scene;

receiving a command selecting a sample of the target frame;

receiving a command identifying a color correction parameter in the primary color domain associated with the sample;

determining a hue-domain parameter associated with the sample;

defining a sector in the hue-domain about the hue-domain parameter associated with the sample;

defining a qualification curve corresponding to the sector; and for each image of the scene, mixing the input signal and the color correction parameter within the sector in accordance with the qualification curve.

10. The method of claim 9, wherein:

the hue-domain parameter is selected from the group including hue, saturation, and luminance.

11. The method of claim 10, wherein the hue-domain parameter is a first hue-domain parameter and the qualification curve is a first qualification curve, further comprising the steps of:

determining a second hue-domain parameter associated with the sample;

defining a second qualification curve about the second hue-domain parameter and corresponding to the sector;

combining the first and second qualification curves to obtain a combined qualification curve; and wherein the step of mixing the input signal comprises the step of mixing the input signal and the color correction parameter within the sector in accordance with the combined qualification curve.

12. The method of claim 11, wherein:

the first and second hue-domain parameters are selected from the group including hue, saturation, and luminance.

13. The method of claim 11, further comprising the steps of:
  determining a third hue-domain parameter associated with the sample;
  defining a third qualification curve about the third hue-domain parameter and corresponding to the sector;
  combining the first, second, and third qualification curves to obtain a total qualification curve; and wherein
  the step of mixing the input signal comprises the step of mixing the input signal and the color correction parameter within the sector in accordance with the total qualification curve.

14. The method of claim 10 wherein:
  the first, second, and third hue-domain parameters include hue, saturation, and luminance.

15. The method of claim 13, further comprising the steps of:
  applying a filter to the total qualification curve to obtain an alpha qualification curve; and wherein
  the step of mixing the input signal comprises the step of mixing the input signal and the color correction parameter within the sector in accordance with the alpha qualification curve.

16. The method of claim 13, further comprising the steps of:
  defining a geometric constraint corresponding to the input signal; and
  limiting the mixing of the input signal and the color correction parameter in accordance with the geometric constraint.

17. An apparatus for selectively applying image processing to an image, comprising:
  means for receiving an input signal corresponding to the image from an image source in a primary color domain;
  means for receiving a command selecting a sample of the input signal;
  means for receiving a command identifying a color correction parameter in the primary color domain associated with the sample;
  means for determining a hue-domain parameter associated with the sample;
  means defining a sector in the hue-domain about the hue-domain parameter associated with the sample;
  means defining a qualification curve corresponding to the sector; and
  a mixer operative for mixing the input signal and the color correction parameter within the sector in accordance with the qualification curve.

18. The apparatus of claim 17, wherein:
  the hue-domain parameter is selected from the group including hue, saturation, and luminance.

19. The apparatus of claim 17, wherein the hue-domain parameter is a first hue-domain parameter and the qualification curve is a first qualification curve, and further comprising:
  means for determining a second hue-domain parameter associated with the sample;
  means defining a second qualification curve about the second hue-domain parameter and corresponding to the sector;
  means for combining the first and second qualification curves to obtain a combined qualification curve; and wherein
  the mixer is operative for mixing the input signal and the color correction parameter within the sector in accordance with the combined qualification curve.

20. The apparatus of claim 19, wherein:
  the first and second hue-domain parameters are selected from the group including hue, saturation, and luminance.

21. The apparatus of claim 19, further comprising:
  means for determining a third hue-domain parameter associated with the sample;
  means defining a third qualification curve about the third hue-domain parameter and corresponding to the sector;
  means for combining the first, second, and third qualification curves to obtain a total qualification curve; and wherein
  the mixer is operative for mixing the input signal the color correction parameter within the sector in accordance with the total qualification curve.

22. The apparatus of claim 17, wherein:
  the first, second, and third hue-domain parameters include hue, saturation, and luminance.

23. The apparatus of claim 21, further comprising:
  an alphas filter operative upon the total qualification curve for obtaining an alpha qualification curve; and wherein
  the mixer is operative for mixing the input signal and the color correction parameter within the sector in accordance with the alpha qualification curve.

24. The apparatus of claim 21, further comprising:
  means defining a geometric constraint corresponding to the input signal; and
  means for limiting the mixing of the input signal and the color correction parameter in accordance with the geometric constraint.

25. An apparatus for selectively applying image processing to images in a plurality of frames defining a scene, comprising:
  means for receiving an input signal defining images of a scene from an image source in a primary color domain;
  means for receiving a command selecting a target frame of the scene;
  means for receiving a command selecting a sample of the target frame;
  means for receiving a command identifying a color correction parameter in the primary color domain associated with the sample;
  means for determining a hue-domain parameter associated with the sample;
  means defining a sector in the hue-domain about the hue-domain parameter associated with the sample;
  means defining a qualification curve corresponding to the sector; and
  a mixer for mixing the input signal and the color correction parameter within the sector in accordance with the qualification curve for each frame of the scene.

26. The apparatus of claim 25, wherein:
  the hue-domain parameter is selected from the group including hue, saturation, and luminance.

27. The apparatus of claim 26, wherein the hue-domain parameter is a first hue-domain parameter and the qualification curve is a first qualification curve, and further comprising:
  means for determining a second hue-domain parameter associated with the sample;

means defining a second qualification curve about the second hue-domain parameter and corresponding to the sector;

means for combining the first and second qualification curves to obtain a combined qualification curve; and wherein the mixer is operative for mixing the input signal and the color correction parameter within the sector in accordance with the combined qualification curve.

28. The apparatus of claim 27, wherein:

the first and second hue-domain parameters are selected from the group including hue, saturation, and luminance.

29. The apparatus of claim 27, further comprising:

means for determining a third hue-domain parameter associated with the sample;

means defining a third qualification curve about the third hue-domain parameter and corresponding to the sector;

means for combining the first, second, and third qualification curves to obtain a total qualification curve; and wherein the mixer is operative for mixing the input signal and the color correction parameter within the sector in accordance with the total qualification curve.

30. The apparatus of claim 29, wherein:

the first, second, and third hue-domain parameters include hue, saturation, and luminance.

31. The apparatus of claim 29, further comprising:

a filter for filtering the total qualification curve to obtain an alpha qualification curve; and wherein the mixer is operative for mixing the input signal and the color correction parameter within the sector in accordance with the alpha qualification curve.

32. The apparatus of claim 29, further comprising:

means defining a geometric constraint corresponding to the input signal; and means for limiting the mixing of the input signal and the color correction parameter in accordance with the geometric constraint.

33. A method for selectively applying image processing to an image, the method carried out in a system coupled to an image source, comprising the steps of:

receiving an input signal from the image source, the input signal corresponding to the image;

receiving a color correction parameter for application to the image;

determining a hue-domain parameter associated with input signal;

defining a sector in the hue-domain corresponding to the hue-domain parameter;

defining a qualification curve corresponding to the sector; and mixing the input signal and the color correction parameter in accordance with the qualification curve.

34. The method of claim 33, wherein the input signal is in a primary color domain, and the mixing of the input signal and the color correction parameter is in conducted in the primary color domain.

35. The method of claim 33, wherein:

the hue-domain parameter is selected from the group including hue, saturation, and luminance.

36. The method of claim 33, further comprising the steps of:

determining a second hue-domain parameter associated with the input signal;

defining a second qualification curve about the second hue-domain parameter and corresponding to the sector;

combining the first and second qualification curves to obtain a total qualification curve; and wherein the step of mixing the input signal comprises the step of mixing the input signal the color correction parameter within the sector in accordance with the total qualification curve.

37. The method of claim 36 wherein:

the first or second hue-domain parameters include hue, saturation, and luminance.

38. The method of claim 36, further comprising the steps of:

applying a filter to the total qualification curve to obtain an alpha qualification curve; and wherein the step of mixing the input signal comprises the step of mixing the input signal and the color correction parameter within the sector in accordance with the alpha qualification curve.

39. The method of claim 33, further comprising the steps of:

defining a geometric constraint corresponding to the input signal; and mixing of the input signal and the color correction parameter in accordance with the geometric constraint.

40. A method for selectively applying image processing to a plurality of images defining a scene, the process carried out in a system coupled to an image source, comprising the steps of:

receiving an input signal corresponding to the images defining the scene from the image source;

receiving a color correction parameter for application to the images;

determining a hue-domain parameter associated with the input signal;

defining a sector in the hue-domain about the hue-domain parameter;

defining a qualification curve corresponding to the sector; and for each image of the scene, mixing the input signal and the color correction parameter in accordance with the qualification curve.

41. The method of claim 40, wherein:

the hue-domain parameter is selected from the group including hue, saturation, and luminance.

42. The method of claim 41, wherein the hue-domain parameter is a first hue-domain parameter and the qualification curve is a first qualification curve, further comprising the steps of:

determining a second hue-domain parameter associated with the sample;

defining a second qualification curve about the second hue-domain parameter;

combining the first and second qualification curves to obtain a total qualification curve; and wherein the step of mixing the input signal comprises the step of mixing the input signal and the color correction parameter in accordance with the combined total curve.

43. The method of claim 42, wherein:

the first and second hue-domain parameters are selected from the group including hue, saturation, and luminance.

44. The method of claim 42, further comprising the steps of:

applying a filter to the total qualification curve to obtain an alpha qualification curve; and wherein the step of mixing the input signal comprises the step of mixing the input signal and the color correction parameter in accordance with the alpha qualification curve.

45. The method of claim 40, further comprising the steps of:

defining a geometric constraint corresponding to the input signal; and mixing of the input signal and the color correction parameter in accordance with the geometric constraint.

46. A method for selectively applying image processing to an image, the method carried out in a system coupled to an image source, comprising the steps of:

receiving a primary domain input signal from the image source, the input signal corresponding to the image;

receiving a color correction parameter for application to the image;

defining a hue-domain qualifier for application of the color correction parameter;

defining a geometric qualifier for application of the color correction parameter; and applying the color correction parameter to the input signal in accordance with the hue-domain qualifier and the geometric qualifier.

47. The method of claim 46, wherein the input signal is in a primary color domain, and the application of the color correction parameter is effected in the primary color domain, without conversion to another color domain.

48. The method of claim 46, wherein the input signal is in a primary color domain, and the mixing of the input signal and the color correction parameter is in conducted in the primary color domain.

49. The method of claim 46, wherein:

the hue-domain parameter is selected from the group including hue, saturation, and luminance.

50. The method of claim 46, wherein the hue-domain parameter is a first hue-domain parameter, and further comprising the steps of:

determining a second hue-domain parameter associated with the input signal;

defining a second qualification curve corresponding the second hue-domain parameter;

combining the first and second qualification curves to obtain a total qualification curve; and wherein the step of applying the color correction parameter to the input signal comprises applying the color correction parameter in accordance with the total qualification curve and the geometric qualifier.

51. The method of claim 46 wherein:

the first or second hue-domain parameters include hue, saturation, and luminance.

52. The method of claim 46, further comprising the steps of:

applying a filter to the total qualification curve to obtain an alpha qualification curve; and wherein the step of applying the color correction parameter to the input signal comprises applying the color correction parameter in accordance with the alpha qualification curve.

53. A system for selectively applying image processing to an image, comprising:

means for receiving a primary domain input signal from an image source, the input signal corresponding to the image;

means for receiving a color correction parameter for application to the image;

means defining a hue-domain qualifier for application of the color correction parameter;

means defining a geometric qualifier for application of the color correction parameter; and a component for applying the color correction parameter to the input signal in accordance with the hue-domain qualifier and the geometric qualifier.

54. The system of claim 53, wherein the input signal is in a primary color domain, and the application of the color correction parameter is effected in the primary color domain, without conversion to another color domain.

55. The system of claim 53, wherein the input signal is in a primary color domain, and the mixing of the input signal and the color correction parameter is in conducted in the primary color domain.

56. The system of claim 53, wherein:

the hue-domain parameter is selected from the group including hue, saturation, and luminance.

57. The system of claim 53, wherein the hue-domain parameter is a first hue-domain parameter, and further comprising:

means for determining a second hue-domain parameter associated with the input signal;

means defining a second qualification curve corresponding the second hue-domain parameter;

a mixer for combining the first and second qualification curves to obtain a total qualification curve; and wherein the component for applying the color correction parameter to the input signal is operative for applying the color correction parameter to the input signal in accordance with the total qualification curve and the geometric qualifier.

58. The system of claim 53 wherein:

the first or second hue-domain parameters include hue, saturation, and luminance.

59. The system of claim 53, further comprising:

a filter operative on the total qualification curve to obtain an alpha qualification curve; and wherein the component for applying the color correction parameter to the input signal is operative for applying the color correction parameter in accordance with the alpha qualification curve.

* * * * *